(12) United States Patent
Bhattacharya et al.

(10) Patent No.: US 9,747,183 B2
(45) Date of Patent: Aug. 29, 2017

(54) METHOD AND SYSTEM FOR INTELLIGENT DISTRIBUTED HEALTH MONITORING IN SWITCHING SYSTEM EQUIPMENT

(71) Applicant: Ciena Corporation, Hanover, MD (US)

(72) Inventors: Somen Bhattacharya, Santa Clara, CA (US); Jaffar Hameed Abdul Kather Jilani, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 268 days.

(21) Appl. No.: 14/145,175

(22) Filed: Dec. 31, 2013

(65) Prior Publication Data
US 2015/0186206 A1 Jul. 2, 2015

(51) Int. Cl.
| G06F 11/00 | (2006.01) |
|---|---|
| G06F 11/30 | (2006.01) |
| G06F 11/34 | (2006.01) |
| H04L 12/939 | (2013.01) |
| H04L 12/26 | (2006.01) |

(52) U.S. Cl.
CPC .......... *G06F 11/3027* (2013.01); *G06F 11/34* (2013.01); *H04L 43/10* (2013.01); *H04L 49/557* (2013.01)

(58) Field of Classification Search
USPC ........................................................ 714/47.1
See application file for complete search history.

(56) References Cited

U.S. PATENT DOCUMENTS

| 2005/0240812 A1* | 10/2005 | Anderson | G06F 11/2017 714/11 |
|---|---|---|---|
| 2007/0220301 A1* | 9/2007 | Brundridge | G06F 11/2028 714/4.1 |
| 2008/0205622 A1* | 8/2008 | Robesky | H04M 3/2218 379/220.01 |
| 2009/0016043 A1* | 1/2009 | Hruby | G02B 6/4452 361/827 |

(Continued)

OTHER PUBLICATIONS

D. Awduche et al., "RSVP-TE: Extensions to RSVP for LSP Tunnels". Network Working Group, Request for Comments: 3209, Category: Standards Track. Dec. 2001. p. 1-61.

(Continued)

*Primary Examiner* — Sarai Butler
(74) *Attorney, Agent, or Firm* — Clements Bernard Walker PLLC; Christopher L. Bernard; Lawrence A. Baratta, Jr.

(57) ABSTRACT

A method for distributed health monitoring and fault repairing in a switching system. The switching system having one or more supervisory cards, one or more line cards, and one or more switch fabric cards. The method includes transmitting a health status poll request message to the one or more line cards and the one or more switch fabric cards. Thereafter, the method includes receiving health status poll response messages from each of the one or more line cards and the one or more switch fabric cards. Each health status poll response message includes health status summary of the corresponding card. Further, the method involves detecting one or more faults in the switching system based on the (Continued)

health poll response messages. Finally, the method includes triggering at least one action on the detection of the faults in the switching system. These actions are triggered based on a set of predefined rules.

19 Claims, 8 Drawing Sheets

(56) References Cited

U.S. PATENT DOCUMENTS

| | | | | |
|---|---|---|---|---|
| 2013/0013957 A1* | 1/2013 | Armstrong | ………. | H04L 41/0654 714/4.12 |
| 2014/0129876 A1* | 5/2014 | Addepalli | ………… | H04L 41/064 714/37 |

OTHER PUBLICATIONS

E. Mannie, "Generalized Multi-Protocol Label Switching (GMPLS) Architecture". Network Working Group, Request for Comments: 3945, Category: Standards Track. Oct. 2004. p. 1-69.

J. Lang et al., "Generalized Multi-Protocol Label Switching (GMPLS) Recovery Functional Specification". Network Working Group, Request for Comments: 4426, Category: Standards Track. Mar. 2006. p. 1-23.

L. Andersson et al., "MPLS Transport Profile (MPLS-TP) Control Plane Framework". Internet Engineering Task Force (IETF), Request for Comments: 6373, Category: Informational. ISSN: 2070-1721. Sep. 2011. p. 1-57.

D. Frost et al., "MPLS Transport Profile Data Plane Architecture". Internet Engineering Task Force (IETF), Request for Comments: 5960, Category: Informational. ISSN: 2070-1721. Aug. 2010. p. 1-15.

N. Sprecher et al., "MPLS Transport Profile (MPLS-TP) Survivability Framework". Internet Engineering Task Force (IETF), Request for Comments: 6372, Category: Informational. ISSN: 2070-1721. Sep. 2011. p. 1-56.

M. Bocci, "An Architecture for Multi-Segment Pseudowire Emulation Edge-to-Edge". Network Working Group, Request for Comments: 5659, Category: Informational. Oct. 2009. p. 1-24.

S. Bryant et al., "Pseudo Wire Emulation Edge-to-Edge (PWE3) Architecture". Network Working Group, Request for Comments: 3985, Category: Informational. Mar. 2005. p. 1-42.

* cited by examiner

METHOD AND SYSTEM FOR INTELLIGENT DISTRIBUTED HEALTH MONITORING IN SWITCHING SYSTEM EQUIPMENT

BACKGROUND OF THE INVENTION

1. Field of the Invention

The invention disclosed herein relates, in general, to switching system equipment. More specifically, the present invention relates to a method for intelligent distributed health monitoring and fault repairing in switching system equipment.

2. Description of the Related Art

Emergence and penetration of communications technology has definitely changed the way we work, communicate, and socialize. Businesses these days rely a lot on communications technology and, hence, connectivity has become a prerequisite for every business. Further, switching technologies such as Multiprotocol Label Switching (MPLS) have helped businesses to harness the potential of communications technology to the fullest because of the connectivity provisions they offer with remote locations. For reliable connectivity services, specifically in large switching systems, overall availability and reliability of connectivity services is dependent on proper functioning of hardware and software components of the switching systems as well as the peripheral components. Accordingly, various health monitoring mechanisms are used to track a status of the hardware and the software components in large switching systems.

The health monitoring aspects of a distributed packet switching platform plays a vital role in ensuring the reliability and availability of the services it provides in various deployment networks, ranging from service provider, data centers, cloud computing, high performance scientific computing clusters, storage area networks, time sensitive financial and health services networks. Since health monitoring determines the robustness and availability of the individual switching nodes, it ultimately determines the overall health and safety of the network interconnecting routers and switches. The quality and efficiency of the health monitoring system in switching platforms directly determines the cost of maintenance and servicing related downtime, cost of timeliness for repairs, the forecasting of lifetime. Thus the health monitoring is of critical importance for reducing overall costs of network deployment, maintenance leading to market differentiation and growth of opportunities for revenue generation.

Currently, the heath monitoring mechanisms deployed for switching systems are only able to verify whether the hardware and software components of the switching systems are able to exchange periodic heath check request messages and response poll messages. These health monitoring mechanisms conclude the availability of the switching systems only on the basis of successful exchange of these heath check request messages and response poll messages. Usually, these health monitoring mechanisms work well in smaller setups, however, in a large distributed switching system, there are cases when the components may experience operational faults, but still are able to exchange poll messages. Certainly, such cases provide false information about the availability and health of the switching systems and overlook the actual operational failures.

Further, conventional health monitoring mechanisms don't offer self-corrective provisions and, therefore, are incompetent in triggering any corrective action when operational failures in the switching systems are identified. Furthermore, current health monitoring mechanisms rely solely on poll messages and do not use any statistical performance measurement or threshold violation monitoring as a tool to identify potential problems in the switching systems.

Lack of good health monitoring mechanisms and inability to have self-corrective provisions impacts reliability and performance of transport tunnel services in MPLS and Generalized Multi-Protocol Label Switching (GMPLS) traffic engineered networks and Layer Two Virtual Private Networks.

According to the foregoing discussion, it can be observed that the existing methods and mechanisms used for monitoring health of switching systems are inadequate to ensure high performance, better reliability and availability of the switching systems. Firstly, these mechanisms only rely on poll messages to various components of the switching systems. Further, these mechanisms do not offer any self-corrective provisions. In light of this, therefore, there is a need for a method and system for intelligent distributed health monitoring in switching system equipment, which overcomes some or all of the limitations identified above.

SUMMARY

Further scope of applicability of the present invention will become apparent from the detailed description given hereinafter. However, it should be understood that the detailed description and specific examples, while indicating various embodiments of the invention, are given by way of illustration only, since various changes and modifications within the spirit and scope of the invention will become apparent to those skilled in the art from this detailed description.

In some exemplary embodiments of the present invention, a method for distributed health monitoring and fault repairing in a switching system equipment is provided. The switching system equipment has at least one supervisory card, one or more line cards, and one or more switch fabric cards. The supervisory cards are interconnected with the line cards and the switch fabric cards through a backplane. Further, the supervisory cards, the line cards, and the switch fabric cards have corresponding control processors capable of running embedded operating systems. The method includes transmitting a health status poll request message to the one or more line cards and the one or more switch fabric cards. Thereafter, the method includes receiving one or more health status poll response messages from each of the one or more line cards and the one or more switch fabric cards in response to the health status poll request message. Each health status poll response message includes health status summary of hardware and software modules of the corresponding line card or switch fabric card. Further, the method involves detecting one or more faults in the switching system equipment based on the one or more health poll response messages. Finally, the method includes triggering at least one action on the detection of the faults in the switching system equipment. These actions are triggered based on a set of predefined rules.

In some exemplary embodiments of the present invention, another method for distributed health monitoring and fault repairing in a switching system equipment is provided. The switching system equipment has at least one supervisory card, one or more line cards, and one or more switch fabric cards. The supervisory cards are interconnected with the line cards and the switch fabric cards through a backplane. Further, the supervisory cards, the line cards, and the switch fabric cards have corresponding control processors capable of running embedded operating systems. The method includes multicasting a master health status summary report message to the one or more line cards and the one or more switch fabric cards. Further, the method includes receiving one or more slave health status summary report messages from a corresponding each of the one or more line cards and the one or more switch fabric cards in response to the master health status summary report message. Each slave health status summary report messages includes health status summary of hardware and software modules of the corresponding line card or switch fabric card. Moreover, the method includes detecting one or more faults in the switching system equipment based on analysis of the master health status summary report message and the one or more slave health status summary report messages. The method also includes triggering at least one action to repair the one or more faults detected in the switching system equipment based on a set of predefined policies.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

Figure 1A:
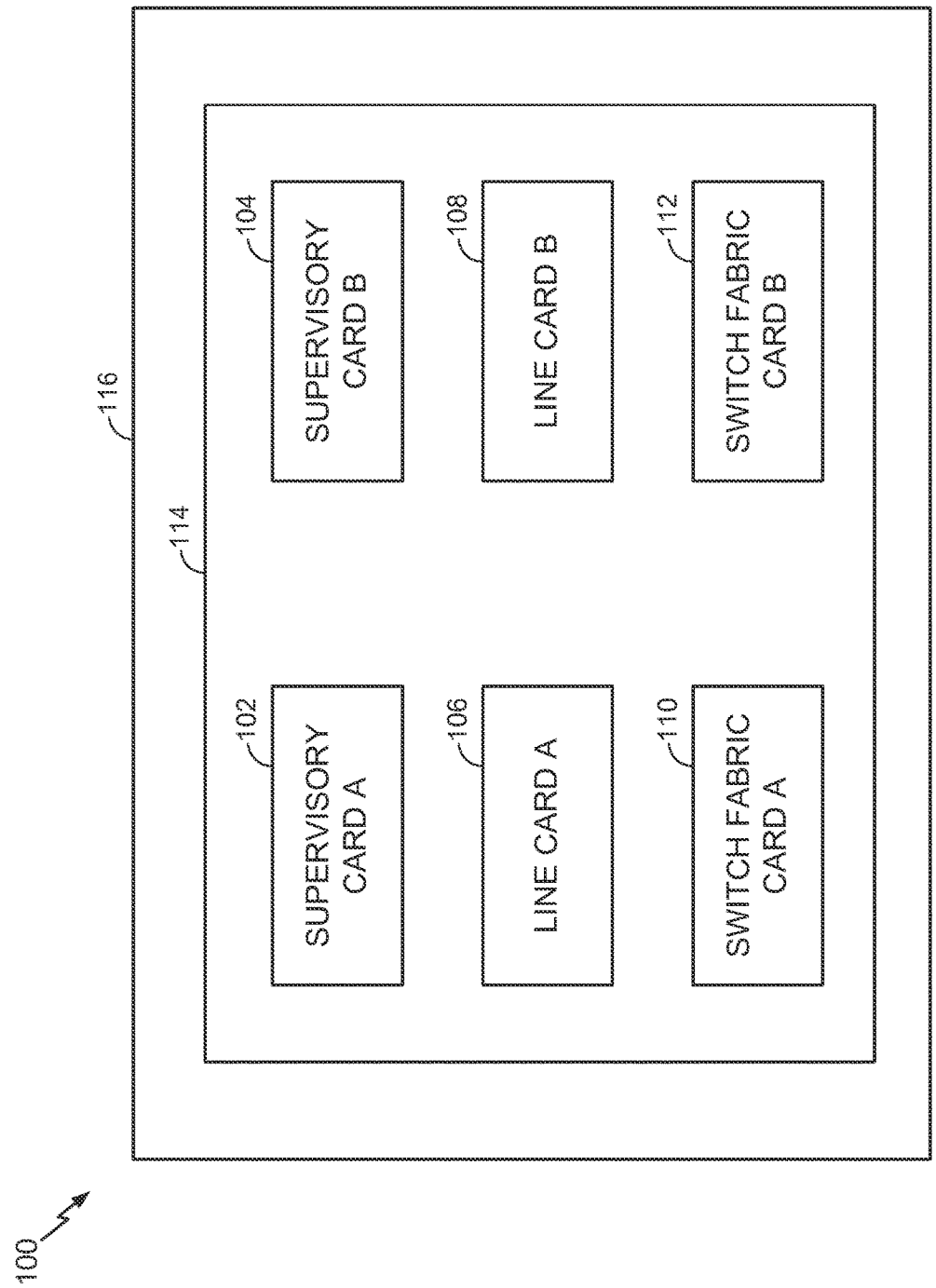
FIG. 1a and FIG. 1b illustrate an exemplary switching system equipment in accordance with various embodiments of the present invention.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention.

There may be additional structures described in the foregoing application that are not depicted on one of the described drawings. In the event such a structure is described, but not depicted in a drawing, the absence of such a drawing should not be considered as an omission of such design from the specification.

DETAILED DESCRIPTION

The various embodiments of the invention are described hereinafter with reference to the accompanying drawings, in which embodiments of the invention are shown. However, the various embodiments may be embodied in many different forms and should not be construed as limited to the embodiments set forth herein. Rather, these embodiments are provided to illustrate various aspects of the invention.

Aspects of embodiments of the invention are disclosed in the following description and related drawings directed to specific embodiments of the invention. Alternate embodiments may be devised without departing from the scope of the invention. Additionally, well known elements of the invention will not be described in detail or will be omitted so as not to obscure the relevant details of embodiments of the invention. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

ACRONYMS AND ABBREVIATIONS

Figure 1B:
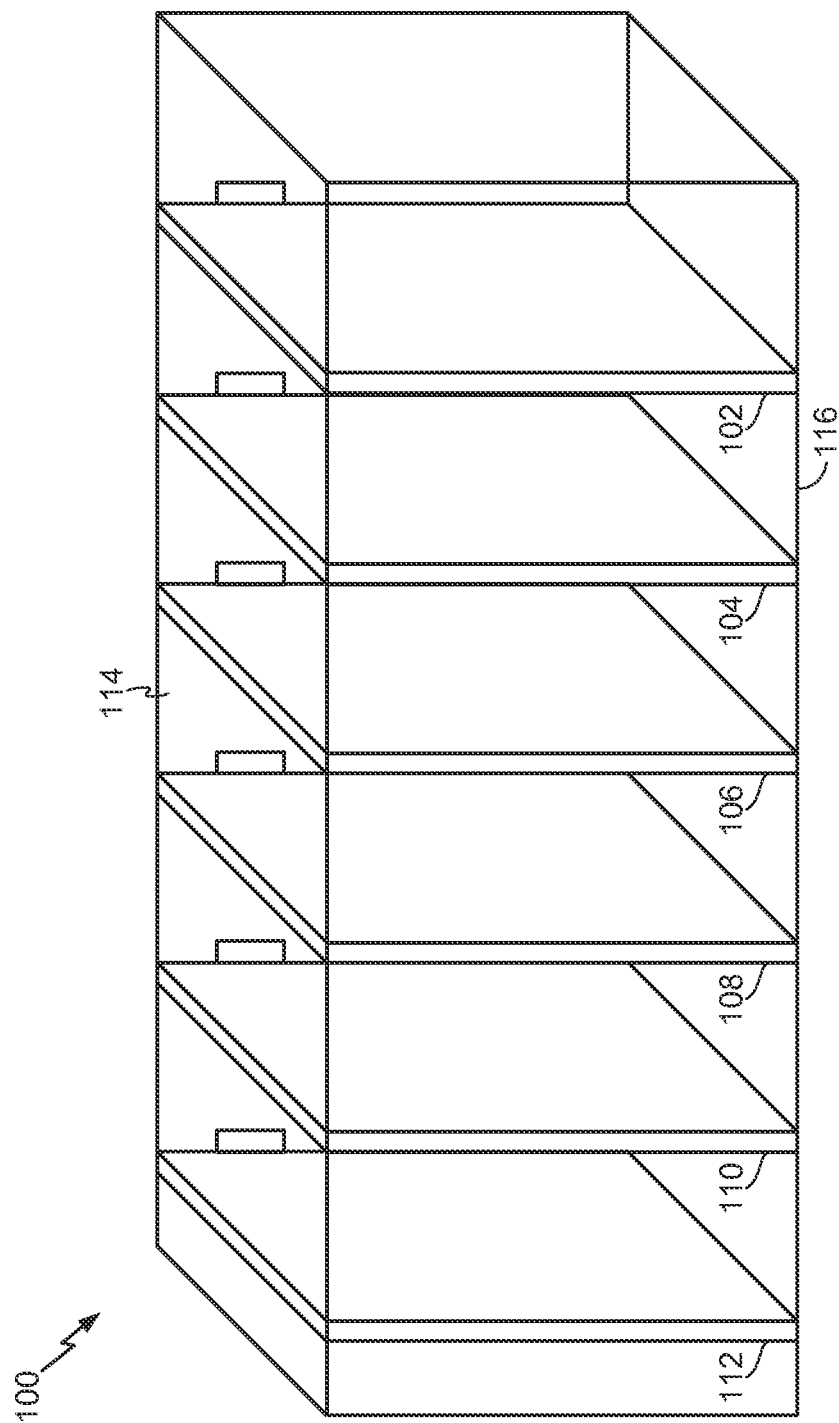

The following list describes the acronyms and abbreviations used in this document.
CPU—Central Processing Unit
DESA—Distributed Ethernet Switching Architecture
DRAM—Dynamic Random Access Memory
FIP—Fabric Interface Port
FSM—Fine State Machine
FTM—Fan Tray Module
HM—Health Monitoring
HMM—Health Monitoring Management
ISSU—In-Service Software Upgrade
IVCP—Image Version Check Protocol
MPVN—Minimum HM Protocol Version Number
NPU—Network Processor Unit
PFM—Packet Forwarding Module
PHM—Process Health Monitor
PSM—Power Supply Module
SCM—Supervisory Control Module
SCTP—Stream Controlled Transmission Protocol
SFI—Software Fault Isolation
SFM—Switch Fabric Module
SFR—Software Fault Repair
SOA—Service Oriented Architecture
SSO—State-full Switchover
TCAM—Ternary Content Addressable Memory
TCP—Transmission Control Protocol
UDP—User Datagram Protocol Referring now to the drawings, FIG. 1a and FIG. 1b illustrate an exemplary switching system equipment 100, in accordance with some embodiments of the present invention. Examples of the switching system equipment 100 can include, but are not limited to, network switches and routers with switching capabilities such as Ciena® 5410 series switches and network equipment. The switching system equipment 100 is capable of linking network segments or network devices. The switching system equipment 100 receives data packets from various network segments or devices connected to the switching system equipment 100. Further, the switching system equipment 100 transmits the data packets to specific network segments or devices based on the desired destination of the data packets. Most of the commercial grade switching system equipment is available in form of stackable switches. A stackable switch is essentially a group of one or more network switches combined together to act as a single switch, thus, providing higher port capacity.

Typically, the switching system equipment 100 can include a supervisory card A 102, another supervisory card B 104, a line card A 106, another line card B 108, a switch fabric card A 110, another switch fabric card B 112, a chassis 116, a backplane 114, a power supply (not shown in FIG. 1a and FIG. 1b), and a fan tray 116 (not shown in FIG. 1a and FIG. 1b). Those skilled in the art would appreciate that the switching system equipment 100 may contain greater or fewer number of components without deviating from the scope of the invention.

The chassis 116 is the physical frame of the switching system equipment 100 where all the cards, such as the supervisory card A 102, the supervisory card B 104, the line card A 106, the line card B 108, the switch fabric card A 110, the switch fabric card B 112, the power supply, and the fan tray are mounted. The chassis 116 also protects all the cards from deteriorating factors, like, dust, moisture and tempering. Further, the chassis 116 also includes the backplane 114 that is essentially a circuit board having sockets for holding various cards. The backplane 114 also acts as a medium for connecting various cards and also enables data communication between the various cards mounted on the chassis 116. The power supply connected to the chassis 116 via backplane 114 provides power to all the cards mounted to the chassis 116 and the fan tray keeps the temperature of all the cards under specified temperature range to ensure proper functioning of all the cards.

Moving to the line cards 106 and 108, the line cards 106 and 108 are the interface to the network. Line cards contain modular electronic circuits capable of interfacing various network segments or devices connected to the ports of the line cards 106 and 108 to the remaining network. The line cards 106 and 108 are capable of handling all the layer 2 switching. Those skilled in the art would appreciate that the switching system equipment 100 may contain greater or fewer number of line cards to enhance the port capacity of the switching system equipment 100.

The switch fabric card A 110 and the switch fabric card B 112 contain modular electronic circuits capable of controlling the switching paths. The switch fabric cards 110 and 112 can be based on cell-switched, buffered three-stage Benes switch fabric architecture. The switch fabric card A 110 and the switch fabric card B 112 receive data from the line cards 106 and 108 and perform required switching to route the data to the appropriate egress ports of the line cards 106 and 108. The switch fabric cards 110 and 112 are generally divided into four planes. These planes are used to distribute the traffic across the switch fabric cards 110 and 112 evenly.

The supervisory card A 102 and the supervisory card B 104 contain electronic circuits capable of switching, and local as well as remote management of the switching system equipment 100. Usually, the switching system equipment 100 is capable of operating with a single supervisory card; however, in certain cases an additional supervisory card can be added as stand-by, as at any given point of time, usually only one supervisory card is active in the switching system equipment 100.

Further, the supervisory card A 102, the supervisory card B 104, the line card A 106, the line card B 108, the switch fabric card A 110, and the switch fabric card B 112, all contain corresponding control processors capable of running embedded operating system. Moreover, each of these cards has a control switch capable of providing control communication channels through the backplane 114 inside the switching system equipment 100.

Moreover, the supervisory card A 102, the supervisory card B 104, the line card A 106, the line card B 108, the switch fabric card A 110, and the switch fabric card B 112, all contain corresponding health monitor modules. Such a health monitor module can be a software module running on the embedded operating systems of the card, a hardware module, or a combination of hardware and software modules.

Health monitor modules associated with the supervisory cards 102 and 104 are called master health monitor modules and health monitor modules associated with the line card A 106, the line card B 108, the switch fabric card A 110, and the switch fabric card B 112 are called slave health monitor modules. The main purpose of the health monitor modules is to track health status of hardware and software components of the corresponding cards.

Figure 2:
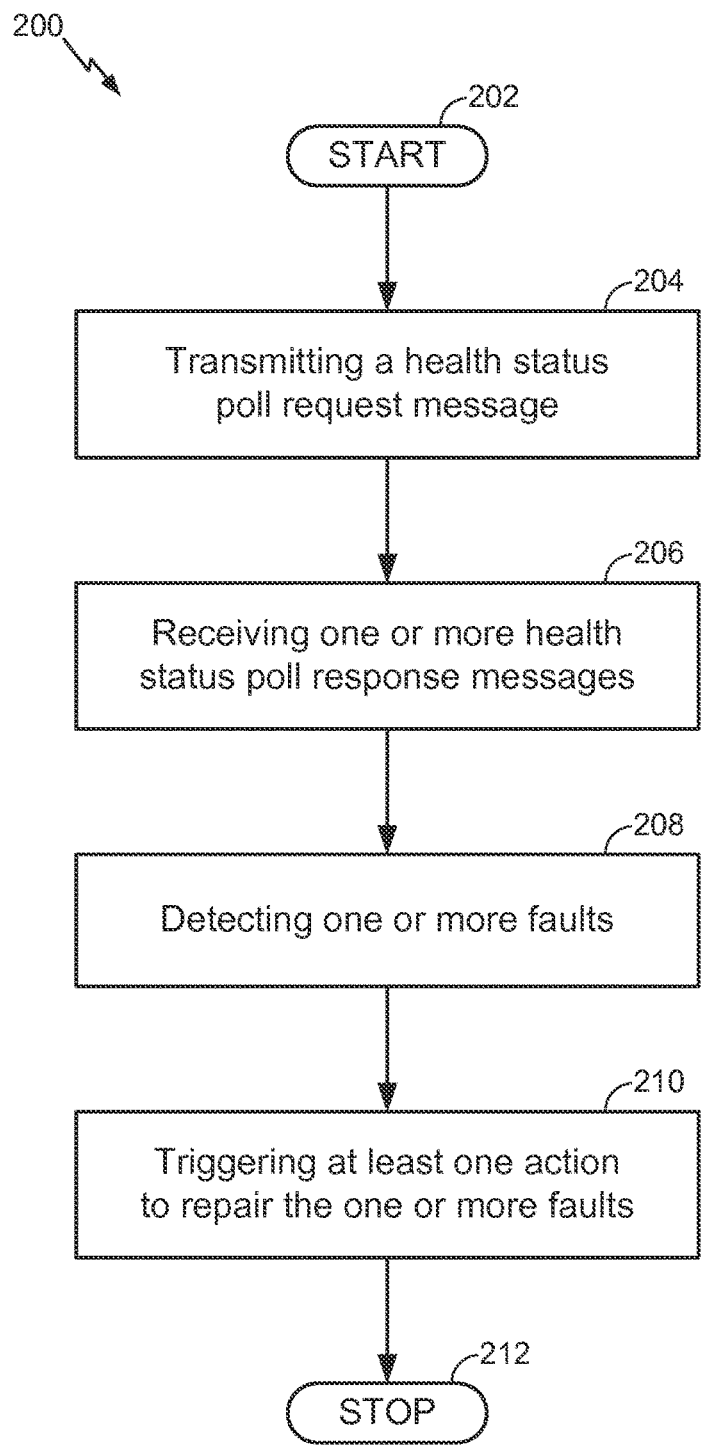
FIG. 2 is a flow chart describing a method for distributed health monitoring and fault repairing in a switching system equipment, in accordance with an embodiment of the present invention.

Referring to the FIG. 2, a method for distributed health monitoring and fault repairing in a switching system equipment is described. To describe FIG. 2, reference will be made to FIG. 1a and FIG. 1b, although it is understood that the method 200 can be implemented in any other suitable system. Moreover, the invention is not limited to the order in which the steps are listed in the method 200. In addition, the method 200 can contain a greater or fewer numbers of steps than those shown in the FIG. 2.

In one embodiment, the method 200 can include one or more method steps for distributed health monitoring and fault repairing in the switching system equipment 100. The method 200 is initiated at step 202. At step 204, the master health monitor modules of the supervisory cards 102 and 104 transmit health status poll request messages to the line cards 106 and 108, and the switch fabric cards 110 and 112.

In one embodiment, the master health monitoring modules running on the supervisory cards 102 and 104 periodically multicast health status poll requests to all the slave health monitor modules running on the line cards 106 and 108, and the switch fabric cards 110 and 112. All the slave health monitor modules upon receiving the health status poll request messages respond back to the master health monitoring modules with a corresponding health status poll response message. The health status poll response message generated by each slave health monitor module includes the health status summary report of hardware and software components associated with that card. For example, the health poll response message generated by the slave health monitor module of the line card A 106 includes the health status summary report of the hardware and software components on the line card A 106.

The health status summary report of various hardware and software components in a particular card is generated by the slave health monitor module of that card based on input status data received from the hardware and software components of that card. Examples of the input status data received from the hardware and software components may include, but are not limited to, temperature sensor data, electrical voltage margining output data, Inter-Integrated Circuit ($I^2C$) bus communication status, $I^2C$ multiplexer operational status, physical port optics interface status, Direct Memory Access (DMA) controller errors, system buffer pool errors, Peripheral Component Interconnect (PCI) bus communication faults, memory controller errors, Ternary Content Addressable Memory (TCAM) read/write operational errors, and Field Programmable Gate Array (FPGA) signal communication errors.

The embodiment discussed above is an example of pull mode health monitoring, as the health status poll response messages are received in response to the health status poll request message. In this embodiment, the master health monitoring modules may also periodically exchange health status poll request and health status poll response with each other.

The health poll response message generated by the slave health monitor module may also include the performance statistics of the hardware and software components of the respective cards. These performance statistics are periodically captured by the slave health monitor modules. The performance statistics of the hardware and software components may include, but are not limited to, transmitted and received packet counts, transmitted and received byte counts, packet drop counts of traffic through internal or external physical and logical ports. Further, the health poll response message may also include information about traffic drop rate of the internal or external physical or logical ports for their respective cards.

Following this, the health status poll response messages generated by all the health monitoring modules are received by the master health monitoring modules at step 206. Further, the master health monitoring modules detect faults in the switching system equipment 100 based on the received health status poll response messages at step 208.

In another embodiment, faults may be detected by the slave heath monitoring modules on their corresponding cards, in addition to the faults detected by the master health monitoring modules. In this embodiment, the fault detection is distributed, as the faults are detected by both master and slave health monitoring modules based on various input data received from various peripheral component status data. Further, information about these detected faults can also be included in the health poll response message generated by health monitor modules.

At step 210, the master health monitoring modules trigger one or more action to repair the one or more faults detected in the switching system equipment 100. These actions may be triggered based on a set of predefined policies. Further, the actions may include, but are not limited to, re-running a set of diagnostic tests, resetting the components such as control switch or control processors of the cards, resetting error or fault counters, restarting the entire switching system equipment 100 in the event of an unrecoverable error, logical exclusion of faulty components via resource partitioning, triggering self-repair through restart of software and/or hardware components, triggering a switchover of a primary supervisory card (for example, the supervisory card A 102) to a standby supervisory card (for example, the supervisory card B 102), tagging the faulty software and/or hardware components as unavailable or faulty and communicating to other health monitoring modules, and continuous performance monitoring with a target to re-instate faulty or unavailable components back online (whenever the measured performance reaches the threshold to classify the software and/or hardware components as available).

For example, in case the traffic drop rate exceeds a predefined threshold for a particular port, then that port may be considered under-performing or unreliable. Further, when the monitored traffic drop rate goes below the predefined threshold, then that port can be considered available again. To monitor traffic drop rate, various schemes such as a continuous leaky bucket based error rate monitoring scheme can be used.

In another example, the master and slave heath monitoring modules may consider part of a card or entire line card or switch fabric card or even supervisory card as under-performing or partially/completely unavailable depending on the set of predefined policies. Examples of the set of predefined policies can be policies related to threshold value for error tolerance and policies related to traffic drop rate threshold. Further, the availability and reliability of the switching system equipment 100 can be computed based on the comparison of history of monitored errors and faults against defined thresholds as well.

In a manner similar to detection of faults, triggering actions to repair the faults detected in the switching system equipment 100 can also distributed. In this embodiment, actions to repair the faults may be triggered by the slave heath monitoring modules on their corresponding cards, in addition to the master health monitoring modules. Thereafter, the method 200 terminates at step 212.

Figure 3:
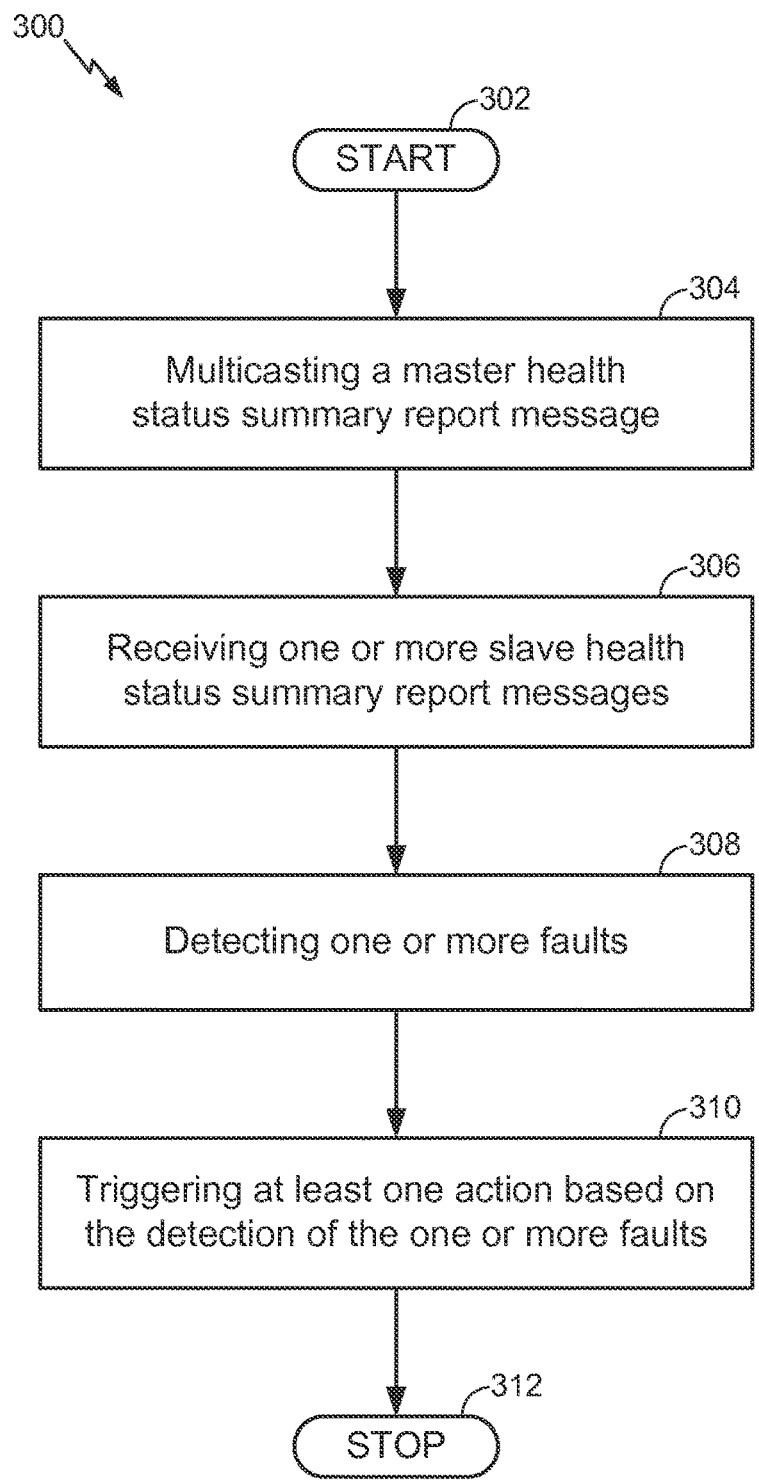
FIG. 3 is a flow chart describing a method for distributed health monitoring and fault repairing in a switching system equipment in accordance with another embodiment of the present invention.

Referring to the FIG. 3, another method for distributed health monitoring and fault repairing in a switching system equipment is described. To describe FIG. 3, reference will be made to FIG. 1a and FIG. 1b, although it is understood that the method 300 can be implemented in any other suitable system. Moreover, the invention is not limited to the order in which the steps are listed in the method 300. In addition, the method 300 can contain a greater or fewer numbers of steps than those shown in the FIG. 3.

In one embodiment, the method 300 can include one or more method steps for distributed health monitoring and fault repairing in the switching system equipment 100. The method 300 is initiated at step 302. At step 304, the master health monitoring modules running on the supervisory cards 102 and 104 multicast their health status summary report message (master health status summary report message) to the line cards 106 and 108 and the switch fabric cards 110 and 112. The master health status summary report messages include health status summary of hardware and software modules of the corresponding supervisory card. The slave health monitor modules also send their corresponding unsolicited health status summary report messages to the master health monitoring modules in response to the master health status summary report message. At step 306, the health status summary report messages sent by the slave health monitor modules (slave health status summary report messages) are received by the master health monitoring modules. The slave health status summary report messages include health status summary of hardware and software modules of the corresponding line cards or switch fabric cards.

This embodiment is an example of push mode health monitoring, as all the health monitoring modules simply push their respective status. In this embodiment, the master health monitoring modules may also periodically exchange health status poll response messages unsolicited between themselves.

Following this, at step 308, the master health monitoring modules detect faults in the switching system equipment 100 based on the analysis of the received health status summary report messages and the master health status summary report message. As discussed in reference with FIG. 2, here also fault detection can be performed in a distributed manner, i.e., faults may be detected by the slave heath monitoring modules on their corresponding cards, in addition to the faults detected by the master health monitoring modules.

At step 310, the master health monitoring modules trigger one or more action to repair the one or more faults detected in the switching system equipment 100. These actions may be triggered based on a set of predefined policies. In a manner similar to detection of faults, triggering actions to repair the faults detected in the switching system equipment 100 can also distributed, i.e., actions to repair the faults may be triggered by the slave heath monitoring modules on their corresponding cards in addition to the master health monitoring modules. Thereafter, the method 300 terminates at step 312.

In another embodiment, the fundamental characteristics of a distributed switching platform are that the key hardware and software components of the architecture, which need to be monitored, are distributed across the entire physical structure of the switching system. The degree of components distribution also increases in proportion with higher scalability and higher performance requirements.

This distributed organization of the components in this embodiment creates high communication overhead of the monitoring system, due to its high safety and responsiveness requirements. Since the monitoring system introduces additional overhead of bandwidth consumption in the internal network, synchronization requirement among the distributed components, providing fairness among the other non-monitoring related application traffic through the internal network of the switching system is extremely important.

In this embodiment, the distributed switching platforms are built with de-coupled control plane and forwarding plane, which are themselves physically distributed and interconnected through internal network.

The forwarding plane is responsible for switching network traffic and is isolated from the control plane. The control plane is however responsible for managing the configurations, provisioning of hardware and software components of the forwarding plane, facilitating with network management operations and determining the availability of serviceability of distributed components.

In another embodiment, both the forwarding plane and control plane are physically distributed and the distributed control plane is responsible for coordinating among the distributed components for operational and serviceability reasons. Thus the health monitoring system which runs internally in the distributed switching platform, forms part of the distributed control plane and must be highly efficient and reliable, in order to be entrusted with the perceived health of the entire switching system. In this embodiment, efficiency requirements of a distributed health monitoring architecture (DHMA) include scalability, flexibility, robustness, extendibility, and intelligence.

Distributed Health Monitoring Scalability according to one embodiment a health monitoring system allows the increase of number of distributed components to be monitored. E.g. in a chassis based switching system, the number of Line cards or the number of switching Fabric cards may increase with product upgrade or depending on H/W configurations needed for specific network deployment. Similarly number of ports may increase in a upgraded version of Line card or switching Fabric card, for the same chassis architecture. Also in a upgraded version of Line card or switch Fabric card, the number of temperature sensors may increase. In a Fan tray system, the number of redundant Fans may increase with an upgrade of the existing cooling system in the chassis. Alternatively the number of TCAM processors or DRAM memory modules may increase in a new generation of Line Card, due to specific application requirements or for more sophisticated product features. Thus the health monitoring system architecture should be able to scale with the increase of the number of components to be monitored, for increased reliability or fault tolerance.

The health monitoring architecture should also take into account the processing overhead of periodic status poll messages that are exchanged among the distributed components. For certain components, the frequency of health status poll may increase, when fast failure detection and repairing strategy is required, which may require increased processing power and additional communication bandwidths in the existing interconnect networks of components.

Distributed Health Monitoring Flexibility: The health monitoring architecture according to one embodiment a health monitoring system should be flexible enough to allow seamless migration to newer Line card or switch Fabric card or Supervisory card architecture, without requiring fundamental re-design.

The health monitor architecture should be able to adapt with the changing need of multi-core CPUs or multiple sensors on a single card or multiple communication channel links inside the distributed switching system. The health monitor's architecture should not be tightly attached with the specific component's functional behaviors. E.g. the health monitor should be able to work with newer processing algorithms for temperature sensors and newer algorithms for fan speed control in the switching system and faster and more accurate fault detection algorithms.

Distributed Health Monitoring Robustness: The robustness of a distributed system is measured in terms of the degree or to the extent, the overall system can continue to function in the event of one or more component failures or one or more sub-system failures. According to one embodiment a health monitoring system, a distributed switching system with redundant control processor or redundant switching hardware cards, may be able to continue to function in the event of a failure of one of the control processor or switching hardware card. Thus the health monitoring architecture, which forms part of the distributed control plane should allow monitoring of availability or failures of various hardware and software functional sub-systems and components in the distributed switching platform. In such a health monitoring architecture, the robustness can be measured at a finer granularity of system functionalities. Thus the overall robustness of the system can be expressed in terms of the robustness of the various sub-systems. Similarly robustness of a sub-system can be expressed as a function of robustness of the constituent components.

Distributed Health Monitoring Extendibility: According to one embodiment a health monitoring system, hardware and/or software functions are extended to meet the demands of specific market segments or specific customer needs or sometimes to adapt with newer or more sophisticated technologies. Such extension often involve replacement of older hardware of software components and/or insertion of additional hardware or software components to increase the capacity of one or more system functionalities or introduction of new functionalities. Thus the health monitoring architecture should be amenable to seamlessly extending the monitoring functions to newer generation components and to additional components. The architecture should also allow health monitoring to function with newer type of hardware or software fault detection and fault reporting in the system.

Distributed Health Monitoring Intelligence: According to one embodiment a health monitoring system, the overall health of the entire switching system is more important than the individual health of the components of the distributed system. Thus a health monitoring architecture should include a decision support system to correlate the monitored health statuses of various hardware and software components into the health of specific sub-system and likewise correlate the health statuses of various hardware and software sub-systems to determine the overall health of the distributed switching system. Once a hardware or software component has failed and failure status is reported, monitoring and reporting the already known failure until the component is fixed may incur wastage of CPU processing cycles and internal communication link bandwidth, depending on the location of the component. Thus the health monitoring architecture should allow localization and filtering of failed component's monitored statuses, so that internal resources of the distributed switching system are not overused for processing and circulating redundant health information.

Distributed Health Monitoring Platform Architecture (DHMPA): According to one embodiment a health monitoring system, the distributed switching architecture is physically partitioned into control plane and forwarding plane. The control plane consists of 'M' number (M>=1) of control processing cards, termed as 'Supervisory Control Module (SCM)'. The forwarding plane consists of 'N' number (N>=1) packet forwarding processing cards, termed as 'Packet Forwarding Module (PFM)' and 'K' number (K>=1) of switching fabric cards, termed as 'Switch Fabric Module (SFM)'. Each SCM may consist of 'Q' (Q>=1) number of CPUs, one or more Memory modules, DMA Controllers, Flash Disk for storage, Console Port, one or more peripheral devices and thermal sensors. Each PFM may consist of 'P' number (P>1) of packet processing NPUs and 'T' number (T>1) of Traffic Management Chips (TMC), and 'Q' number of CPUs, one or more Memory modules. In a single PFM every 'x' number (x>1) of NPU(s) are connected via physical lines to a TMC.

The PFMs provide physical media interfaces, termed as ports or network interfaces which facilitate connection with other Ethernet switching systems and customer end devices in the external network. The PFMs also have back-end interfaces used to connect to SFM(s). These back-end interfaces are termed as Fabric Interface Port (FIP). Each SFM may consist of 'S' (S>=1) number of switching fabric chips, termed as 'Switch Fabric Element (SFE)', 'Q' number of CPUs, one or more Memory modules.

Figure 4:
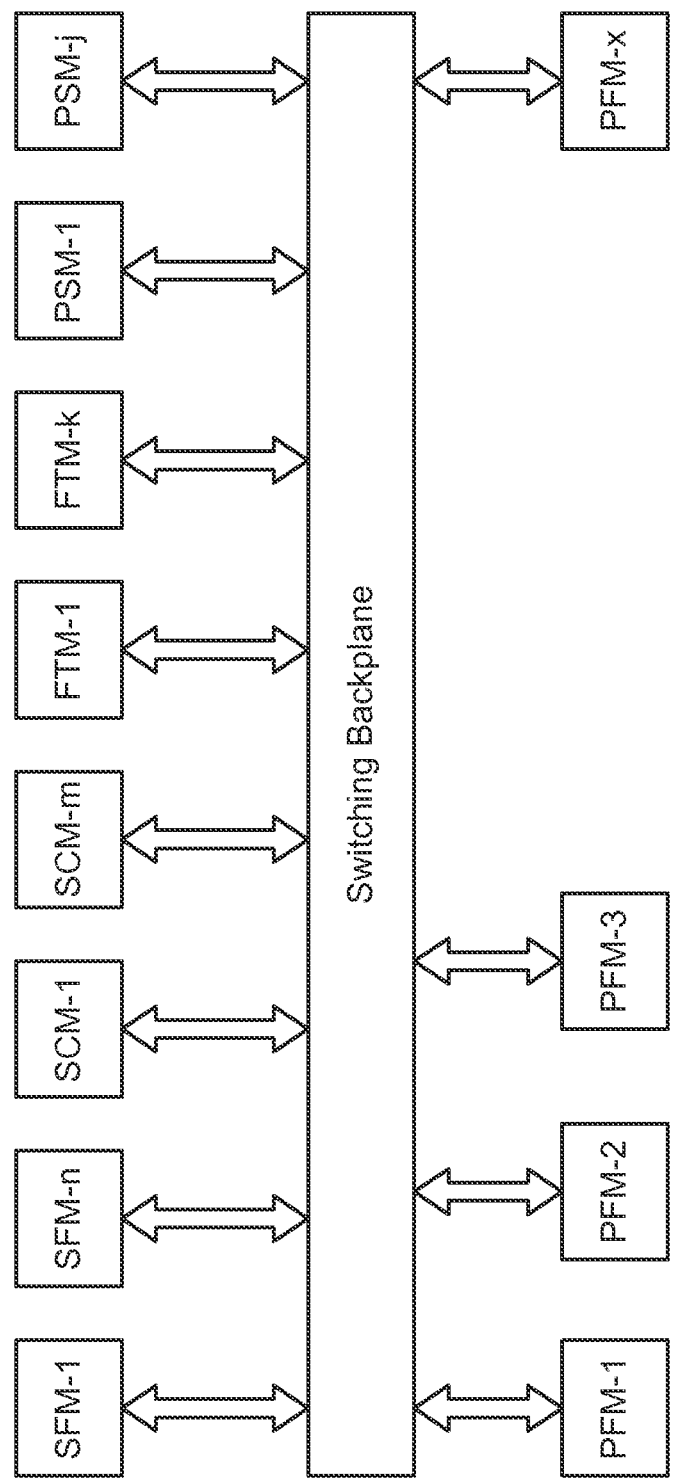
FIG. 4 illustrate an exemplary block diagram of a distributed chassis with control path connections of Switch Fabric Modules (SFM), Supervisory Control Modules (SCM), Fan Tray Modules (FTM), Power Supply Modules (PSM) and Packet Forwarding Modules (PFM) in accordance with various embodiments of the present invention.

Distributed Health Monitoring Physical Topology (DHMPT): According to one embodiment a health monitoring system, the PFMs are connected with the redundant set of SFMs via the FIPs in a 3-stage CLOS network for traffic forwarding purposes. All categories of cards viz. SCM(s), PFM(s), SFM(s) and FCM(s) are connected via the internal Ethernet network with the switching backplane, for performing control plane functions, e.g. control plane command/response message processing, software upgrade, high availability control etc. as shown in FIG. 4. Various aspects of one embodiment will now be described with reference to FIG. 4.

Switch Fabric Module (SFM)—A data plane sub-system which usually consist of H/W switching crossbars and is responsible for switching user's traffic through a switching system, from ingress LM to egress LM.

Supervisory Control Module (SCM)—A control plane sub-system that is responsible for management and supervisory control of the entire switching system and runs various embedded S/W applications including routing, signaling, network management, S/W image loader, system health check, system status monitoring applications, e.g. electrical voltage monitor, temperature monitor etc.

Fan Tray Module (FTM)—An array of FANs (Cooling sub-Systems) responsible for generating cooling for various H/W components and runs under the control of SC(s).

Power Supply Module (PSM)—An UPS responsible for supplying electrical power for the switching system.

Packet Forwarding Module (PFM)—A data plane sub-system which usually consist of Network Processor Units (NPU), Traffic Management H/W Chips, control processor(s) and performs packet forwarding for user's traffic through the switching system.

SFM-y=>y-th Switch Fabric Module.
SCM-y=>y-th Supervisory Control Module.
FTM-y=>y-th Fan Tray Module (Cooling System).
PSM-y=>y-th Power Supply Module.
PFM-y=>y-th Packet Forwarding Module Distributed Health Monitoring Sub-System Functions according to one embodiment will now be described.

Distributed Health Monitoring Control Plane Functions: The PFMs are connected with the redundant set of SFMs via the FIPs in a 3-stage CLOS network for traffic forwarding purposes. All categories of cards viz. SCM(s), PFM(s), SFM(s) and FCM(s) are connected via the internal Ethernet network with the switching backplane, for performing control plane functions, e.g. control plane command/response message processing, software upgrade, high availability control etc. The control plane functions include High Availability Management, Fault Management, Check-Pointing and State Replication, and State-full Switchover and Non-Stop Routing, Graceful Restart, and In-Service Software Upgrade.

Distributed Health Monitoring Control Plane Architecture according to one embodiment will now be described.

Distributed Health Monitoring Control Plane Software Architecture: In conventional software architecture, several system functionalities are integrated into a single sub-system with complex monolithic design approach which often becomes bottleneck for scaling and performance of the switching system. The single sub-system design approach is also a limitation for achieving higher degree of reliability in service provider networks, since a single fault in the sub-system, may result in system crash and restart of the entire system.

Service Oriented Architecture (SOA): the system can be partitioned into multiple functional components where each component may run as an independent OS process. The components would communicate with each other using a message exchange scheme, 'Inter-Process communication (IPC)'. The component services can be dynamically created, destroyed or restarted as OS processes on demand. In this architecture each component OS process runs in its' per-process address space. A process level health monitor (PHM) is responsible for monitoring the health status of component processes. If a component service process dies, then PHM would restart this process. This loosely integrated software architecture would allow easy maintenance and upgrade of the software features, since new features can be easily added to the system, and existing features can be easily modified with this modular approach.

SOA Inter-Process Communication: The components make use of 'Publish/Subscribe' mechanism for services discovery and registration. In other words, when a set of components {C1, C2, C3, . . . Cj, . . . Cn} intend to receive the services of another component 'Ck', subscribe for 'Ck'. When the component 'Ck' is started and initialized, it announces its' availability via 'Publish' mechanism, and the subscriber components Cj, $1<=j<=n$ starts conversation with it. Similarly a component Cj would unsubscribe for Ck, when it does not need to use the services of Ck. Also if the service provider component 'Ck' wants to stop providing the services, then it would un-publish the service. The registered subscribers 'Cj' would the abort their conversation with Ck and cleanup any intermediate states. Similarly if a service providing component 'Ck' wants to gracefully un-publish its' services, then it would broadcast a 'Graceful-Un-Publish' message to all the subscribers and wait for the all the subscribers to finish their work and respond. When the last component in the set {C1, C2, C3, . . . Cj, . . . Cn} has responded to 'Graceful-Un-Publish' request, the service providing component 'Ck' would remove its service.

Figure 5:
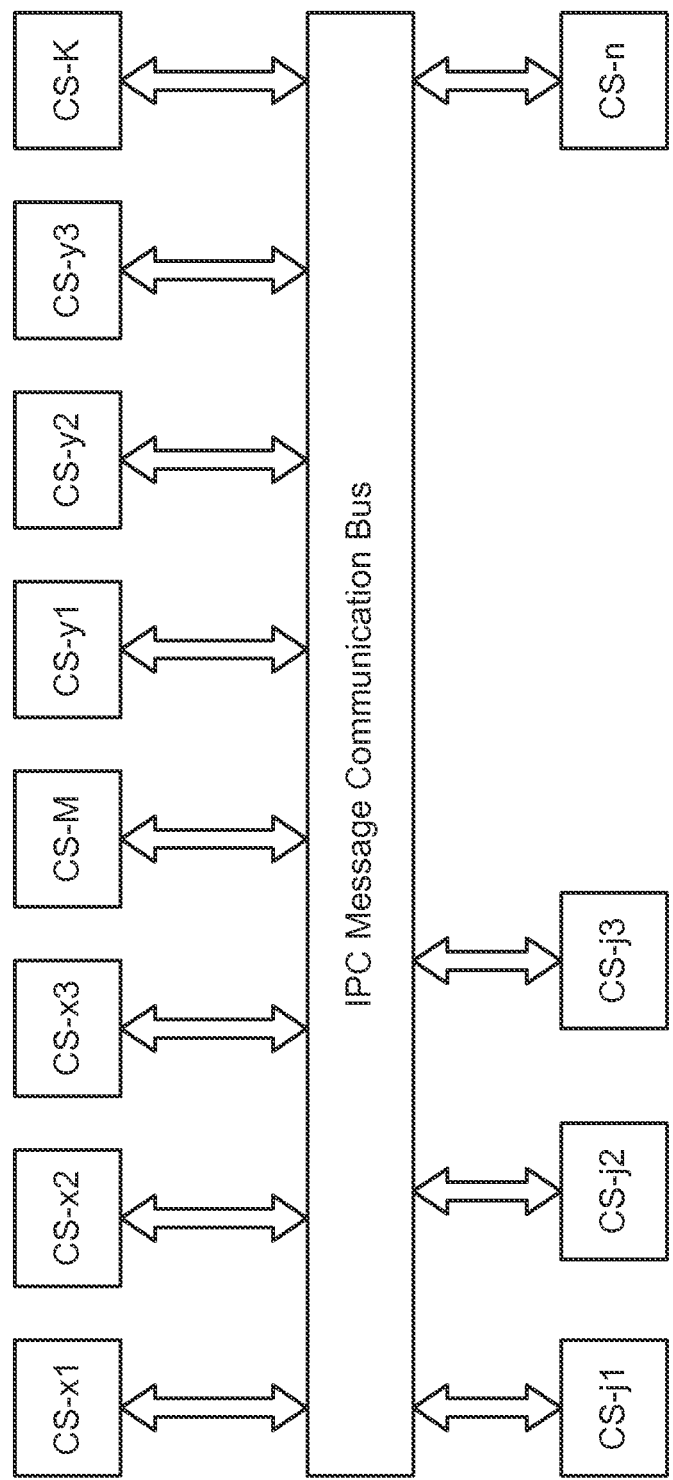
FIG. 5 illustrate an exemplary block diagram depicting the IPC communication among the component services CS-x1, CS-x2, CS-x3, CS-M, CS-y1, CS-y2, CS-y3, CS-K, CS-j1, CS-j2, CS j3, . . . CS-N, using a logical message service bus in accordance with various embodiments of the present invention.

FIG. 5 shows one embodiment of a distributed SOA based, component services block diagram depicting the IPC communication among the component services CS-x1, CS-x2, CS-x3, CS-M, CS-y1, CS-y2, CS-y3, CS-K, CS-j1, CS-j2, CS-j3, . . . CS-N, using a logical message service bus.

Distributed Health Monitoring Management according to one embodiment will now be described. Distributed Health Monitoring Topology Discovery: In order for the distributed health monitoring to function correctly, the sub-systems and components present in the distributed system need to be discovered and their capabilities be known. The discovery may be achieved via static configuration or via dynamic protocol exchanges. Once the discovery is done, a logical topology graph of the interconnected SCMs, PFMs and SFMs can be established to represent an operationally feasible model of the distributed switching system.

A physical topology graph represents all the sub-sub-systems or components that are physically interconnected in the distributed switching platform. However not all of the physical sub-systems may be functional, due to administrative policy restrictions or some of them may be operationally incompatible. Thus the logical topology which may be a sub-graph of the physical topology graph, represents only those interconnected SCMs, PFMs and SFMs which can collectively operate as functional switching system. To represent formally, let $G=<V,E>$ denote the physical topology graph of the distributed switching system. Here 'V' is the vertex set with each of SCM, PFM and SFM representing a vertex in 'G', and 'E' is the edge set containing links connecting the SCM, PFM and SFM sub-systems. A logical topology would be represented as $L=<L(V), L(E)>$, where $L(V)$ is the vertex subset of V, i.e. $L(V)<V$, and $L(E)$ is the edge subset of E, i.e. $L(E)<E$. Thus it is the discovery process that locates and extracts the capabilities of various sub-systems to form a logical topology which may be a sub-graph of the physical topology graph. Once the logical topology graph is established, the scope of health monitoring activities would be limited to this logical topology graph.

However, distributed switching system supports online insertion and removal (OIR) of either of the sub-systems, SCM, PFM and SFM respectively. The discovery process is a continuous act, rather than being a system boot-up time task only. Thus whenever a sub-system SCM, PFM or SFM is inserted or removed to/from the switching platform, the logical topology graph is re-established via discovery, and the health monitoring scope will adapt to this up-to-date logical topology graph.

Distributed Health Monitoring Master-Slave Relationship according to one embodiment will now be described.

SCM-to-SCM Master-Slave Relationship: In a distributed switching platform there can be multiple redundant SCMs for high availability and load balancing purposes. Among the redundant group of SCMs, only one SCM will be configured as primary and the remaining will configured as secondary SCMs. The secondary SCMs may be configured with a unique priority value in the range [1-127]. Initially at system startup the primary SCM that is operational will become the Master SCM. When a dynamic protocol based discovery process is supported, the Primary SCM will advertise itself as Active Master towards all the secondary SCMs and also towards all the PFMs and SFMs. The Primary SCM will do such advertisement using the multicast group addresses 'All SCM HM Group', 'All PFM HM Group' and 'All SFM HM Group' as described under sub-sections [[00117]], [[00118]] and [[00119]] respectively. When dynamic protocol based discovery process is not supported, or not available on all the sub-systems, the Primary SCM can be discovered via static configurations on the SCM, PFM and SFM sub-systems. When the Primary SCM is not available, i.e. either administratively disabled via configuration, or not operationally UP, due to one or more unrecoverable hardware or software faults, the next highest priority secondary SCM which is operationally UP, will assume the role of an active Master and also advertise itself as Master to all the other SCMs, PFMs and SFMs in the distributed system.

Once the Master SCM is elected either based on its' Primary configuration status or based on the highest priority available secondary, all other secondary SCMs will continue to advertise themselves as Backup (Secondary) SCMs, to all SCMs, PFMs and SFMs in the distributed platform. In either case, only the Active Master SCM will be responsible for controlling and coordinating the Health Monitoring activities in all other secondary SCMs, PFMs and SFMs in the entire distributed switching system.

SCM-to-PFM Master-Slave Relationship: When the PFM sub-systems are booted with software, and become operationally UP, will listen to the advertisements from both the primary and backup SCMs, when a dynamic protocol based discovery mechanism is available in the PFM. Based on the received advertisements, the PFM sub-system will build up an in-memory table of SCMs, with their HM capabilities and configuration parameters. From this learnt information the PFM will identify the Master and Backup SCMs. When a dynamic protocol based discovery mechanism is not supported or dynamic discovery has been administratively disabled, the PFM will use the configured parameters to identify the Master and Backup SCMs.

The PFM sub-system will then establish a health monitoring connection with the active master SCM first, which will be considered as the 'Master HM Connection (MAST-HM-CONN)'. After the MAST-HM-CONN is established, PFM will then attempt to establish health monitoring connection with all the backup SCMs. These connections will be regarded as 'Standby HM Connection (STBY-HM-CONN)'. The PFM will respond to the SCM's Heartbeat Poll request which is received over the MAST-HM-CONN, i.e. from Active Master SCM only.

SCM-to-SFM Master-Slave Relationship: When the SFM sub-systems are booted with software, and become operationally UP, will listen to the advertisements from both the primary and backup SCMs, when a dynamic protocol based discovery mechanism is available in the SFM. Based on the received advertisements, the SFM sub-system will build up an in-memory table of SCMs, with their HM capabilities and configuration parameters. From this learnt information the SFM will identify the Master and Backup SCMs.

When a dynamic protocol based discovery mechanism is not supported or dynamic discovery has been administratively disabled, the SFM will use the configured parameters to identify the Master and Backup SCMs. The SFM sub-system will then establish a health monitoring connection with the active master SCM first, which will be considered as the 'Master HM Connection (MAST-HM-CONN)'. After the MAST-HM-CONN is established, SFM will then attempt to establish health monitoring connection with all the backup SCMs. These connections will be regarded as 'Standby HM Connection (STBY-HM-CONN)'. The SFM will respond to the SCM's Heartbeat Poll request which is received over the MAST-HM-CONN, i.e. from Active Master SCM only.

Distributed Health Monitoring Management Agent: In every sub-system of the distributed switching platform, the control plane software infrastructure contains a logical software component for managing various HM related functionalities. The functions of these software components are elaborated in the subsequent sub-sections.

SCM HM Management Agent (SCM-HMM-Agent): This software component runs in the SCM's local control plane and interacts with the HMMPL for sending and receiving HM related asynchronous messages to/from its' counterpart in PFM(s), SFM(s) and other SCM(s). This is responsible for sending/receiving periodic health status poll requests/responses (Heartbeat) to/from remote peers. This is also responsible for discovering the presence of PFMs and SFMs and their capabilities in the distributed switching platform.

PFM HM Management Agent (PFM-HMM-Agent): This software component runs in the PFM's local control plane and interacts with the HMMPL for sending and receiving HM related asynchronous messages to/from its' counterpart in SCM(s), and SFM(s). This is responsible for sending/receiving periodic health status poll requests/responses (Heartbeat) to/from remote peers. This is also responsible for discovering the presence of SCMs and SFMs and their capabilities in the distributed switching platform.

SFM HM Management Agent (SFM-HMM-Agent): This software component runs in the SFM's local control plane and interacts with the HMMPL for sending and receiving HM related asynchronous messages to/from its' counterpart in SCM(s), other SFM(s). This is responsible for sending/receiving periodic health status poll requests/responses (Heartbeat) to/from remote peers. This is also responsible for discovering the presence of SCMs and PFMs and their capabilities in the distributed switching platform.

Distributed Health Monitoring Configuration: Since during distributed health monitoring agent discovery, the health monitoring capabilities are exchanged among the various sub-system resident agents, viz. SCM-HMM-Agent, PFM-HMM-Agent and SFM-HMM-Agent, the capabilities must be configured at various sub-systems, for the discovery to be effective and accurate. The HM capabilities learnt via discovery are key to correct functioning of health monitoring across the sub-systems and determining the accurate availability of the sub-systems and overall availability of the distributed switching system. These parameters will now be discussed according to one embodiment.

SCM-HMM-Agent Configuration Parameters:

Heartbeat Transmit Interval (HBTI)—The periodic time interval at which SCM sends Heartbeat poll requests to PFM-HMM-Agent(s) and SFM-HMM-Agent(s).

Heartbeat Dead Interval (HBDI)—The maximum duration of time the SCM will wait without receiving Heartbeat response from a PFM-HMM-Agent or SFM-HMM-Agent, after which SCM will consider the PFM or SFM sub-system as dead. This timer should be an integer multiple of Heartbeat Transmit Interval, The default value is expressed as HBDI=3*HBTI.

SCM HM Administrative State (SCM-HAS)—The administratively configured state of the SCM's HM. The operator can enable or disable this parameter via configuration. When it's set to disabled, the SCM-HMM-Agent will not send periodic Heartbeat Poll requests to PFM-HMM-Agent(s) and SFM-HMM-Agent(s). The default value is set to 'Admin Enabled'.

PFM HM Administrative State Vector (PFM-HASV)—The vector of administratively configured states of each of the PFM's HM. The operator can enable or disable this parameter for any PFM via configuration. When this admin state is set to disabled for one or more PFM(s), the SCM-HMM-Agent will not send periodic Heartbeat Poll requests to those specific PFM-HMM-Agent(s). This parameter is useful for maintenance and troubleshooting purposes. This is also used when software backward compatibility support. As an example, in a heterogeneous switching platform, when one or more PFM sub-system(s) are running older version of software images that do not support or recognize the Health monitoring SFM HM Administrative State Vector (SFM-HASV)—The vector of administratively configured state of each of the SCM's HM. The operator can enable of disable this parameter for any SFM via configuration. When this admin state is set to disabled for one or more SFM(s), the SCM- HMM-Agent will not send periodic Heartbeat Poll requests to those specific SFM-HMM-Agent(s).

PFM-HMM-Agent Configuration Parameters:

Heartbeat Receive Interval (HBRI)—The periodic time interval at which PFM expects to receive Heartbeat poll requests from SCM-HMM-Agent(s).

Heartbeat Dead Interval (HBDI)—The maximum duration of time the PFM will wait without receiving Heartbeat Poll requests from SCM-HMM-Agent, after which PFM will consider the current active master SCM sub-system as dead. This timer should be an integer multiple of Heartbeat Receive Interval. The default value is expressed as HBDI=3*HBRI.

SFM-HMM-Agent Configuration Parameters:

Heartbeat Receive Interval (HBRI)—The periodic time interval at which SFM expects to receive Heartbeat poll requests from SCM-HMM-Agent(s).

Heartbeat Dead Interval (HBDI)—The maximum duration of time the SFM will wait without receiving Heartbeat Poll requests from SCM-HMM-Agent, after which SFM will consider the current active master SCM sub-system as dead. This timer should be an integer multiple of Heartbeat Receive Interval. The default value is expressed as HBDI=3*HBRI.

Distributed Health Monitoring Protocol Interoperability: The health monitoring architecture according to one embodiment will allow multiple versions of health monitoring protocol to inter-operate in the same distributed switching platform. A heterogeneous distributed switching platform may consist of multiple generations of SCM(s), PFM(s) and SFM(s) due to hardware and/or software feature upgrades, where each generation of sub-system may run different versions of software images. Also different versions of software images may run different versions of health monitoring protocols, which may all be compatible, or one or more of the protocol versions may be incompatible. Thus sub-systems during HM discovery phase will identify what version of HM protocols are the neighbor sub-systems running. The HM Agents in the sub-systems as a part of discovery process will negotiate and agree on the highest version of HM protocol that all the participating sub-systems are capable of running. This will allow in-service software upgrades (ISSU) in the distributed switching platform.

To express formally, let us assume a sub-system 'S(j)' is running HM protocol with version number 'V(j)'. We also assume that 'S(j)' has 'm' number of HM neighbor sub-systems {S(p1), S(p2), S(p3), . . . S(pm)}, which are running HM protocols with higher version numbers, say {V(p1), V(p2), V(p3), . . . V(pm)}, and 'n' number of HM neighbor sub-systems {S(q1), S(q2), S(q3) . . . S(qn)}, which are running HM protocols with lower version numbers, say {V(q1), V(q2), V(q3), . . . V(qm)}. After the HM discovery process, the 'S(j)' will self configure it's HM parameters, so that it can run a HM protocol, with a version number equal to the minimum value from the set {V(q1), V(q2), V(q3), . . . V(qm)}.

SCM Health Monitoring Interoperability: Since the Master SCM node controls the health monitoring in the entire distributed switching platform, it will select the minimum version number among all the HM protocol versions advertised by the other secondary SCMs, the PFMs and SFMs. The Master SCM then re-advertises, the chosen 'Minimum HM Protocol Version Number (MPVN)', to all other HM neighbors, i.e. Secondary SCMs, PFMs and SFMs.

PFM Health Monitoring Interoperability: When a PFM sub-system discovers the 'Active Master SCM', it will learn the 'MPVN' value assigned. The PFM then compares it's local HM Protocol Version number with MPVN. If the two version numbers are different, the PFM will self re-configure it's HM parameters, so that it can run HM protocol with version number as 'MPVN'.

SFM Health Monitoring Interoperability: When a SFM sub-system discovers the 'Active Master SCM', it will learn the 'MPVN' value assigned. The SFM then compares it's local HM Protocol Version number with MPVN. If the two version numbers are different, the SFM will self re-configure it's HM parameters, so that it can run HM protocol with version number as 'MPVN'.

Distributed Health Monitoring Communication Model: Inside the distributed switching platform, specific sub-systems are logically grouped to represent multicast groups. When a HM related message is sent to this group, the message is received by all members of the group.

All SCM HM Group (All-SCM-HMG): All the SCM sub-systems collectively represent this multicast group. When any SCM wants to send a message such that it is received only by other SCMs in the chassis, this multicast group is used. Also any PFM or SFM can send a message to this group, so that it is received by all SCMs.

All PFM HM Group (All-PFM-HMG): All the PFM sub-systems collectively represent this multicast group. When any PFM wants to send a message such that it is received only by other PFMs in the chassis, this multicast group is used. Also any SCM or SFM can send a message to this group, so that it is received by all PFMs.

All SFM HM Group (All-SFM-HMG): All the SFM sub-systems collectively represent this multicast group. When any SFM wants to send a message such that it is received only by other SFMs in the chassis, this multicast group is used. Also any PFM or SCM can send a message to this group, so that it is received by all SFMs.

Distributed Health Monitoring FSM Model: In order to determine the system's availability and usability as a switching system in a reliable and robust manner, the individual HM management agents as enumerated in sub-section [[0094]], run a HM fine state automaton (HM-FSM), to process various requests/responses and asynchronous event notifications, termed as FSM literal events. The HM-FSM functions as a reactive system, i.e. it accepts the literal input events to execute an appropriate action, and transitions from one state to another to reflect the correct behavior of the sub-system. Each HM management agent maintains the current state of the HM-FSM that accurately reflects the availability of that sub-system. Since the HM management agents are physically distributed across the interconnected sub-system, a collective representation of their HM-FSM states accurately reflects the overall availability of the entire system.

The HM framework according to one embodiment consists of the following three HM-FSM(s).

SCM HM-FSM (SCM-HM-FSM)—Health monitoring FSM run in the SCM's control plane.

PFM HM-FSM (PFM-HM-FSM)—Health monitoring FSM run in the PFM's control plane.

SFM HM-FSM (SFM-HM-FSM)—Health monitoring FSM run in the SFM's control plane.

The details of the state transition model of HM-FSM(s) according to one embodiment will now be described.

Primary-SCM Health Monitoring FSM Events:

SCM HM Connection Setup Request—A HM Connection setup request has been received from a Backup SCM, or PFM or SFM.

SCM HM Connection Teardown—A HM Connection teardown request has been received from a Backup SCM, or PFM or SFM.

SCM HM Master Manual Switchover—A HM manual master switchover request has been received from operator via CLI or SNMP.

SCM HM Connection Failure—A HM Connection with a Backup SCM, or PFM or SFM has failed, as detected by the transport layer connection management or heartbeat misses.

SCM HM Configuration Response—A HM Configuration response has been received from a Backup SCM, or PFM or SFM.

SCM HM Heartbeat Poll Response—A Heartbeat Poll Response has been received from a Backup SCM, or PFM or SFM.

Primary SCM Health Monitoring FSM States:

Primary SCM HM Disconnected State (PRI-SCM-HM-Disconnected): Initially after a software image is booted, the SCM-HM-Agent will read its' configuration and identify itself as a Primary or Backup SCM-HM-Agent. Among the (N+1) SCM(s), a single SCM needs to be elected as 'Active Master SCM'. The SCM-HM-Agent will initially be in the Disconnected state. If the SCM is configured as Primary, then it will assume the role of Master SCM, and advertise itself as 'Active Master SCM" to all Backup SCM(s), PFM(s) and SFM(s). The local SCM's HM-FSM will transition to the SCM-HM-Connected state.

Primary SCM HM Connected State (PRI-SCM-HM-Connected): In this state the Master SCM-HM-Agent will listen to the Connection request from all Backup SCM-HM-Agent(s), PFM-HM-Agent(s) and SFM-HM-Agent(s). If a Connection Request is received from either a Backup SCM-HM-Agent or PFM-HM-Agent or SFM-HM-Agent, then it will update its' local HM-Connection Table, with the sender's identity and also store the HM capability parameters of the sending HM-Agent. The Master SCM-HM-Agent will then send a Connection response back to the sender. If there are HM parameters configured via CLI or SNMP for a specific Backup SCM or PFM or SFM sub-system, then Master SCM-HM-Agent will send those HM parameters as Configuration requests to the Backup SCM-HM-Agent(s), PFM-HM-Agent(s) and SFM-HM-Agent(s), whichever agent applicable. The Master SCM-HM-Agent then waits for HM-Configuration Responses from, Backup SCM-HM-Agent(s), PFM-HM-Agent(s), SFM-HM-Agent(s).

If a successful Configuration Response is received from any of the Backup SCM, PFM or SFM, then Master SCM-HM-Agent will start sending periodic Heartbeat Poll requests to that HM Agent. If the Configuration request is rejected by any of the Backup SCM, PFM or SFM, then Master SCM-HM-Agent will log an error report to the system log. The Master SCM-HM-Agent will still start sending periodic Heartbeat Poll requests to that HM Agent, but will use default configuration parameters for that HM Agent.

The Master SCM-HM-Agent will continue to listen for Connection requests from any other new Backup SCM, PFM or SFM. If Heartbeat Poll response is not received from any of the Backup SCM-HM-Agent or PFM-Agent or SFM-HM-Agent, for a maximum allowed number of Polls then Master SCM-HM-Agent will do the followings:

Mark that HM Agent as dead in its' local HM-Connection Table.

Log an error report to the system log.
Generate a Critical failure Alarm.
Stop sending Heartbeat Poll requests to that Agent.

Depending upon the health monitoring policy configurations, may trigger a diagnostic Self-Test of the non-responding sub-system.

Reset or reboot the non-responding sub-system.
Reset or reboot the entire distributed switching platform.

If the Master SCM-HM-Agent receives a 'Manual Switchover' command from CLI or SNMP, then it will stop generating Heartbeat Poll requests. It will also send an advertisement 'Active Master SCM Changed' to notify all the Backup SCM-HM-Agent(s), PFM-HM-Agent(s) and SFM-HM-Agent(s) about this change of Active Master.

If the Master SCM-HM-Agent detects a transport layer connection failure, from the HMTL, for any Backup-HM-Agent or PFM-HM-Agent or SFM-HM-Agent, then the Master will mark that HM Agent as dead in its' HM-Connection Table and stop sending Heartbeat Poll request to that HM-Agent.

Backup-SCM Health Monitoring FSM Events:

SCM HM Connection Setup Response—A HM Connection setup response has been received from a Primary or Backup SCM.

SCM HM Connection Teardown—A HM Connection teardown request has been received from a Primary-SCM or Backup-SCM, or PFM or SFM.

SCM HM Active Master Change—A HM active master change request has been received from the current Master SCM.

SCM HM Connection Failure—A HM Connection with SCM, PFM or SFM has failed, as detected by the transport layer connection management or heartbeat misses.

SCM Connection Recovery Timer expires—Maximum allowed time to locate the next highest priority connected Backup SCM or connecting to an alternate Backup SCM has expired.

SCM HM Connection Setup successful—A successful connection response is received from a Primary-SCM or another Backup-SCM.

Backup-SCM Health Monitoring FSM States:

Backup-SCM HM Disconnected State (BAK-SCM-HM-Disconnected): Initially after a software image is booted, the SCM-HM-Agent will read its' configuration and identify itself as Backup SCM-HM-Agent and also read the identity of the Primary SCM. Among the (N+1) SCM(s), a single SCM needs to be elected as 'Active Master SCM'. The SCM-HM-Agent will initially be in the Disconnected state.

Since the SCM is configured as Backup, it will advertise itself as Backup SCM to all SCM(s), PFM(s) and SFM(s). The SCM-HM-Agent will attempt Connection establishment with the Primary SCM, which was identified via configuration or from the received advertisements. The SCM-HM-Agent will attempt to establish a HM connection with the Primary SCM first, by sending a HM connection request. If the SCM-HM-Agent receives a successful Connection Response from the Primary SCM, then the SCM-HM-FSM will transition to the BAK-SCM-HM-Connected state. If a Connection response is not received or the Connection Request is rejected by the Primary SCM, then the local SCM-HM-Agent will continue attempting Connection establishment with all the remaining Backup SCM(s), which it had received advertisements from, in a round robin manner, in the descending order of priorities until a successful connection response is received.

If the SCM-HM-Agent receives Advertisement from a new Backup SCM, which was not yet known, then it will attempt Connection establishment with this new Backup SCM. If the SCM-HM-Agent receives a successful Connection Response from a Backup SCM, the it will mark that SCM as connected in its' HM connection control table. The local SCM-HM-Agent will run a election algorithm against the entries of its' HM-Connection Table, to locate the highest priority Backup SCM. If this connection attempt fails, then SCM-HM-Agent will determine its' chance of becoming the Master SCM, by comparing it's priority with that of all other Backup SCM's that had sent advertisements. If the local SCM's priority is highest, then it will start a Wait-To-Become-Master timer. If no other SCM with higher priority advertises, within this waiting time, then the local SCM will declare itself as Master by sending advertisements to all other Backup SCM-HM-Agent(s), PFM(s) and SFM(s).

If any advertisement is received from another SCM with higher priority, then the local SCM will cancel the timer and proceed with connection establishment as a Backup SCM. Re-attempt connection establishment by sending connection request to the next highest priority Backup SCM, that it has learnt from the SCM's advertisements. If a HM policy is configured to stop retrying connection establishment with SCM(s), after a maximum number of attempt failures, then SCM-HM-Agent will log an error message and report a critical alarm. After a maximum number of connection retry failures, the SCM-HM-Agent will remain in the Disconnected state, until a operator resets or power cycles this SCM or the distributed switching system is rebooted. However if the PHM-HM-Agent receives a successful Connection response either from any of the Backup SCM(s), then the SCM-HM-FSM will transition to the PHM-HM-Connected state. The PHM-HM-Agent will consider this Backup SCM as the current 'Active Master SCM'.

If all Backup SCM entries in the HM-Connection Table have priorities lower than the priority of the local Backup SCM, then in this state the SCM-HM-Agent will not respond to any Configuration requests or Heartbeat Poll requests, from any non-Master SCM sub-system. However the SCM-HM-Agent may respond to any Status Query request from any of the non-Master Backup SCM(s), since sometimes console operator or CLI/SNMP User may want to display the status or statistics of health monitoring operations via a Backup SCM's console for maintenance or troubleshooting purposes.

If a Master SCM change notification is received from the 'Active Master SCM', then SCM-HM-Agent will transition to the SCM-HM-Conn-Recovery state. If a Connection Teardown indication is received from the 'Active Master SCM' then SCM-HM-Agent will transition to the SCM-HM-Conn-Recovery state. If the local transport layer connection to the 'Active Master SCM' is lost, then SCM-HM-Agent will transition to the SCM-HM-Conn-Recovery state. If the SCM-HM-Agent receives a successful Connection Response from the Primary SCM, then the SCM-HM-FSM transitions to the SCM-HM-Connected state.

Backup-SCM HM Connected State (BAK-SCM-HM-Connected): In this state a SCM-HM-Agent is successfully connected with the 'Active Master SCM. While In this state, the SCM-HM-Agent will respond to all Configuration requests, Status Query requests and Heartbeat Poll requests from the 'Active Master SCM'. The SCM-HM-Agent will continue attempting Connection establishment with all the remaining Backup SCM(s), which it had received advertisements from.

If the SCM-HM-Agent receives Advertisement from a new Backup SCM, which was not yet known, then it will attempt Connection establishment with this new Backup SCM.

If the SCM-HM-Agent receives a successful Connection Response from a Backup SCM, the it will mark that SCM as connected in its' HM connection control table. In this state the SCM-HM-Agent will not respond to any Configuration requests or Heartbeat Poll requests, from any non-Master SCM sub-system.

However the SCM-HM-Agent may respond to any Status Query request from any of the non-Master Backup SCM(s), since sometimes console operator or CLI/SNMP User may want to display the status or statistics of health monitoring operations via a Backup SCM's console for maintenance or troubleshooting purposes. If a Master SCM change notification is received from the 'Active Master SCM', then SCM-HM-Agent will transition to the SCM-HM-Conn-Recovery state. If a Connection Teardown indication is received from the 'Active Master SCM' then SCM-HM-Agent will transition to the SCM-HM-Conn-Recovery state. If the local transport layer connection to the 'Active Master SCM' is lost, then SCM-HM-Agent will transition to the SCM-HM-Conn-Recovery state.

Backup-SCM HM Connection Recovery State (BAK-SCM-HM-Conn-Recovery): In this state the 'Active Master SCM' is not known. The SCM-HM-Agent will try to locate from its' local SCM-Connection-Table, an alternate Backup SCM with the next highest priority, that is connected with this SCM. In this state a timer will be running to indicate a maximum timeout allowed to recover HM connection with any alternate Backup SCM. If no Backup SCM in the Connected state can be found in the local SCM-Connection-Table, then SCM will try to locate from this table the next highest Priority Backup SCM that was discovered but not yet Connected. The SCM will then attempt to establish a HM Connection with this Backup SCM.

If no connection response is received, then SCM-HM-Agent will continue attempting connection establishment, in a round robin manner, with the remaining discovered but not connected Backup SCM(s), in the descending order of priorities. If the Max-recovery timeout has elapsed without finding any alternate connected Backup SCM, or without being able to successfully establish connection with any other Backup SCM, then the SCM-HM-Agent will transition to the 'BAK-SCM-HM-Disconnected' state, and data plane packet forwarding operations will be disabled. However if a next highest priority Backup SCM in HM Connected state is found, or a connection has been successfully established with a new Backup SCM, then SCM-HM-Agent will notify all other Backup SCMs, that SCM is intending to use this Backup SCM as the newly chosen 'Active Master SCM'. The SCM-HM-Agent will also transit to the SCM-HM-Connected state.

PFM Health Monitoring FSM Events:

SCM HM Connection Setup Response—A HM Connection setup response has been received from a Primary-SCM or Backup-SCM.

SCM HM Connection Teardown—A HM Connection teardown request has been received from a Primary-SCM or Backup-SCM.

SCM HM Active Master Change—A HM active master change request has been received from current 'Active Master SCM'.

SCM HM Connection Failure—A HM Connection with a Primary-SCM or Backup-SCM has failed, as detected by the transport layer connection management or heartbeat misses.

SCM Connection Recovery Timer expires—Maximum allowed time to locate the next highest priority connected Backup SCM or connecting to an alternate Backup SCM has expired.

SCM HM Connection Setup successful—A successful connection response is received from a Primary-SCM or another Backup-SCM.

PFM Health Monitoring FSM States:

PFM HM Disconnected State (PFM-HM-Disconnected): Initially after a software image is booted, the PFM-HM-Agent will be in the Disconnected state. In this state the PFM-HM-Agent will listen to the advertisements from all SCM-HM-Agents including Primary and Backup(s). The PFM-HM-Agent will attempt to establish a HM connection with the Primary SCM first, by sending a HM connection request.

If the PFM-HM-Agent receives a successful Connection Response from the Primary SCM, then the PFM-HM-FSM transitions to the PFM-HM-Connected state. If this connection fails, then PFM-HM-Agent will re-attempt connection establishment by sending connection request to the next highest priority Backup SCM, that it has learnt from the SCM's advertisements. The PFM-HM-Agent will continue attempting connection establishment in a round robin manner, with all other Backup SCM(s), in the descending order of priorities until a successful connection response is received.

If a HM policy is configured to stop retrying connection establishment with SCM(s), after a maximum number of attempt failures, then PFM-HM-Agent will log an error message and report a critical alarm. After a maximum number of connection retry failures, the PFM-HM-Agent will remain in the Disconnected state, until an operator resets or power cycles this PFM or the distributed switching system is rebooted. However if the PHM-HM-Agent receives a successful Connection response either from any of the Backup SCM(s), then the PFM-HM-FSM will transition to the PHM-HM-Connected state. The PHM-HM-Agent will consider this Backup SCM as the current 'Active Master SCM'.

PFM HM Connected State (PFM-HM-Connected): In this state a PFM-HM-Agent is successfully connected with the 'Active Master SCM. While In this state, the PFM-HM-Agent will respond to all Configuration requests, Status Query requests and Heartbeat Poll requests from the 'Active Master SCM'. The PFM-HM-Agent will continue attempting Connection establishment with all the remaining Backup SCM(s), which it had received advertisements from.

If the PFM-HM-Agent receives Advertisement from a new Backup SCM, which was not yet known, then it will attempt Connection establishment with this new Backup SCM. If the PFM-HM-Agent receives a successful Connection Response from a Backup SCM, then it will mark that SCM as connected in its' HM connection control table. In this state the PFM-HM-Agent will not respond to any Configuration requests or Heartbeat Poll requests, from any non-Master SCM sub-system. However the PFM-HM-Agent may respond to any Status Query request from any of the non-Master Backup SCM(s), since sometimes console operator or CLI/SNMP User may want to display the status or statistics of health monitoring operations via a Backup SCM's console for maintenance or troubleshooting purposes.

If a Master SCM change notification is received from the 'Active Master SCM', then PFM-HM-Agent will transition to the PFM-HM-Conn-Recovery state. If a Connection Teardown indication is received from the 'Active Master SCM' then PFM-HM-Agent will transition to the PFM-HM-Conn-Recovery state. If the local transport layer connection to the 'Active Master SCM' is lost, then PFM-HM-Agent will transition to the PFM-HM-Conn-Recovery state.

PFM HM Connection Recovery State (PFM-HM-Conn-Recovery): In this state the 'Active Master SCM' is not known. The PFM-HM-Agent will try to locate from its' local SCM-Connection-Table, an alternate Backup SCM with the next highest priority, that is connected with this PFM. In this state a timer will be running to indicate a maximum timeout allowed to recover HM connection with any alternate Backup SCM. If no Backup SCM in the Connected state can be found in the local SCM-Connection-Table, then PFM will try to locate from this table, the next highest Priority Backup SCM that was discovered but not yet Connected.

The PFM will then attempt to establish a HM Connection, with this, Backup SCM. If no connection response is received, then SFM-HM-Agent will continue attempting connection establishment, in a round robin manner, with the remaining discovered but not connected Backup SCM(s), in the descending order of priorities. If the Max-recovery timeout has elapsed without finding any alternate connected Backup SCM, or without being able to successfully establish connection with any other Backup SCM, then the PFM-HM-Agent will transition to the PFM-HM-Disconnected' state, and data plane packet forwarding operations will be disabled. However if a next highest priority Backup SCM in HM Connected state is found, or a connection has been successfully established with a new Backup SCM, then PFM-HM-Agent will notify all other Backup SCMs, that PFM is intending to use this Backup SCM as the newly chosen 'Active Master SCM'. The PFM-HM-Agent will also transit to the PFM-HM-Connected state.

SFM Health Monitoring FSM Events:

SCM HM Connection Setup Response—A HM Connection setup response has been received from a Primary-SCM or Backup-SCM.

SCM HM Connection Teardown—A HM Connection teardown request has been received from a Primary-SCM or Backup-SCM.

SCM HM Active Master Change—A HM active master change request has been received from current 'Active Master SCM'.

SCM HM Connection Failure—A HM Connection with a Primary-SCM or Backup-SCM has failed, as detected by the transport layer connection management or heartbeat misses.

SCM Connection Recovery Timer expires—Maximum allowed time to locate the next highest priority connected Backup SCM or connecting to an alternate Backup SCM has expired.

SCM HM Connection Setup successful—A successful connection response is received from a Primary-SCM or another Backup-SCM.

SFM Health Monitoring FSM States:

SFM HM Disconnected State (SFM-HM-Disconnected): Initially after a software image is booted, the SFM-HM-Agent will be in the Disconnected state. In this state the SFM-HM-Agent will listen to the advertisements from all SCM-HM-Agents including Primary and Backup(s). The SFM-HM-Agent will attempt to establish a HM connection with the Primary SCM first, by sending a HM connection request. If the SFM-HM-Agent receives a successful Connection Response from the Primary SCM, then the SFM-HM-FSM transitions to the SFM-HM-Connected state. If this connection fails, then SFM-HM-Agent will re-attempt connection establishment by sending connection request to the next highest priority Backup SCM, that it has learnt from the SCM's advertisements. The SFM-HM-Agent will continue attempting connection establishment in a round robin manner, with all other Backup SCM(s), in the descending order of priorities until a successful connection response is received.

If a HM policy is configured to stop retrying connection establishment with SCM(s), after a maximum number of attempt failures, then SFM-HM-Agent will log an error message and report a critical alarm. After a maximum number of connection retry failures, the SFM-HM-Agent will remain in the Disconnected state, until an operator resets or power cycles this SFM or the distributed switching system is rebooted. However if the PHM-HM-Agent receives a successful Connection response either from any of the Backup SCM(s), then the SFM-HM-FSM will transition to the PHM-HM-Connected state. The PHM-HM-Agent will consider this Backup SCM as the current 'Active Master SCM'.

SFM HM Connected State (SFM-HM-Connected): In this state a SFM-HM-Agent is successfully connected with the 'Active Master SCM. While In this state, the SFM-HM-Agent will respond to all Configuration requests, Status Query requests and Heartbeat Poll requests from the 'Active Master SCM'. The SFM-HM-Agent will continue attempting Connection establishment with all the remaining Backup SCM(s), which it had received advertisements from.

If the SFM-HM-Agent receives Advertisement from a new Backup SCM, which was not yet known, then it will attempt Connection establishment with this new Backup SCM. If the SFM-HM-Agent receives a successful Connection Response from a Backup SCM, the it will mark that SCM as connected in its' HM connection control table. In this state the SFM-HM-Agent will not respond to any Configuration requests or Heartbeat Poll requests, from any non-Master SCM sub-system. However the SFM-HM-Agent may respond to any Status Query request from any of the non-Master Backup SCM(s), since sometimes console operator or CLI/SNMP User may want to display the status or statistics of health monitoring operations via a Backup SCM's console for maintenance or troubleshooting purposes.

If a Master SCM change notification is received from the 'Active Master SCM', then SFM-HM-Agent will transition to the SFM-HM-Conn-Recovery state. If a Connection Teardown indication is received from the 'Active Master SCM' then SFM-HM-Agent will transition to the SFM-HM-Conn-Recovery state. If the local transport layer connection to the 'Active Master SCM' is lost, then SFM-HM-Agent will transition to the SFM-HM-Conn-Recovery state.

SFM HM Connection Recovery State (SFM-HM-Conn-Recovery): In this state the 'Active Master SCM' is not known. The SFM-HM-Agent will try to locate from its' local SCM-Connection-Table, an alternate Backup SCM with the next highest priority, that is connected with this SFM. In this state a timer will be running to indicate a maximum timeout allowed to recover HM connection with any alternate Backup SCM.

If no Backup SCM in the Connected state can be found in the local SCM-Connection-Table, then SFM will try to locate from this table, the next highest Priority Backup SCM that was discovered but not yet Connected. The SFM will then attempt to establish a HM Connection, with this, Backup SCM. If no connection response is received, then SFM-HM-Agent will continue attempting connection establishment, in a round robin manner, with the remaining discovered but not connected Backup SCM(s), in the descending order of priorities. If the Max-recovery timeout has elapsed without finding any alternate connected Backup SCM, or without being able to successfully establish connection with any other Backup SCM, then the SFM-HM-Agent will transition to the 'SFM-HM-Disconnected' state, and data plane packet forwarding operations will be disabled. However if a next highest priority Backup SCM in HM Connected state is found, or a connection has been successfully established with a new Backup SCM, then SFM-HM-Agent will notify all other Backup SCMs, that SFM is intending to use this Backup SCM as the newly chosen 'Active Master SCM'. The SFM-HM-Agent will also transit to the SFM-HM-Connected state.

FTM Health Monitoring FSM Model: The FTM(s) are responsible for controlling the Fan speed, to enhance or reduce the cooling effect in the entire distributed switching platform. The FTM(s) intelligent algorithms to calculate the optimal change required in the Fan speeds, based on the consolidated temperature sensor data from various SCM, PFM and SFM sub-systems of the distributed switching platform. The Master SCM is responsible for consolidating all the temperature sensor data collected from various PFM, SFM and SCM sub-systems, and sending the consolidate data in the form of a temperature change notification to FTM(s). However FTMs in distributed packet switching platforms do not always have enough memory or processing power, to run a software based control plane for Health Monitoring protocols. In such cases Master SCM directly monitors the Health status of the FTM(s) via the control path connection (e.g. I2C Bus connection). But when a software control plane is available in the FTM(s), the Health Monitoring protocol and FSM(s) would run, in the same way as it runs in SFM sub-systems.

PSM Health Monitoring FSM Model: The PSM(s) are responsible for controlling power supply in the entire distributed switching platform. The PSM(s) may run intelligent algorithms to calculate the optimal power supply (e.g. electrical voltage margining) required for the switching backplane, and hence other sub-systems of the distributed switching platform. However PSMs in distributed packet switching platforms do not always have enough memory or processing power, to run a software based control plane for Health Monitoring protocols. In such cases Master SCM directly monitors the Health status of the PSM(s) via the control path connection (e.g. I2C Bus connection). But when a software control plane is available in the PSM(s), the Health Monitoring protocol and FSM(s) would run, in the same way as it runs in SFM sub-systems.

Automatic Software Fault Isolation (ASFI): System health status and stability can be determined by monitoring the health status of individual components, which may be physically distributed across a distributed switching system. Using the health monitoring mechanism, any single component failure can be detected and the fault can be suppressed and repaired within the single component, without having to restart entire system.

Automatic Software Fault Repair (ASFR): Each component's configured state in terms of various configuration parameters are stored in a centralized shared data repository, termed as DataBase (DB). All configuration changes in terms of parameters addition, modification and deletions for all HM aware components of the system are reflected in the DB.

In addition to the configured states, the dynamic states of the HM aware components can also be written into DB. When the dynamic states of the HM aware components are available in the DB, automatic state recovery via reloading from the DB is possible, as a part of automatic fault repair. When a component OS process is aborted due to an unrecoverable fault, such as memory overstepping or an unknown exception during process execution, the process health monitor (PHM) would detect it as heartbeat poll response failure.

The PHM runs under a flexible policy control, and depending on the configured policy, it can either restart the aborted/faulted component OS process, or restart the entire system. When a component process is restarted after a fault, the restarted process will recover all the configured states and dynamic states of execution by reloading itself from the centralized DB repository. The new instance of the process then re-joins the process group, by broadcasting a 'I-Am-Available' message to all the members of the process group. Upon receiving this message, the process group members would resume communication with the new instance of the restarted member process.

Distributed Health Monitoring Protocol Layering Hierarchies: Various components of the distributed switching system which participate in the HM management framework, i.e. Heartbeat, check-pointing, graceful switchover, status query etc. exchange messages among themselves using a layered protocol framework. The components while sending HM messages interact through the 'HM Management Protocol Layer (HMMPL)'. The HMMPL transfers the messages to the underlying 'HM Management Transport Layer (HMMTL)', which is responsible for forwarding those messages to destination HMMTL(s), running on other components of the distributed switching platform. The destination HMMTL(s) upon receiving the messages, de-multiplexes and delivers those to their upper layer HMMPL, which in turn handover the message to the respective HM application agents.

Figure 6:
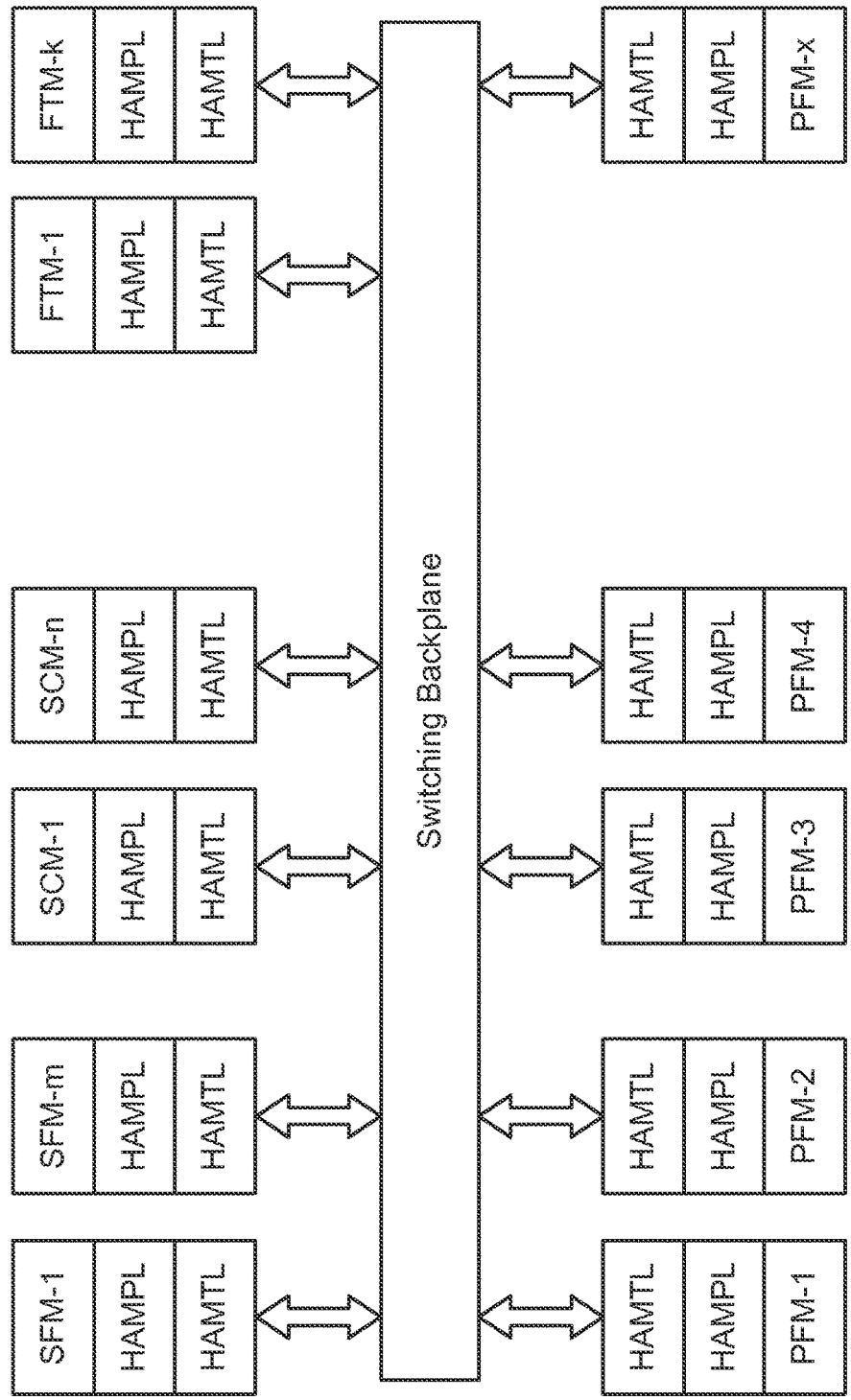
FIG. 6 illustrate an exemplary block diagram depicting the control plane's HM management protocol layers 'HMMPL & 'HMMTL' in each SFM, SCM, FTM and SFM connected via the switching backplane in accordance with various embodiments of the present invention.

As shown in FIG. 6., a distributed chassis based switching system according to one embodiment will now be described. FIG. 6 depicts the control plane's HM management protocol layers 'HMMPL & 'HMMTL' in each of 'm' number of SFM(s), 'n' number of SCM(s), 'k' number of FTM(s) and 'x' number of SFM(s) which are connected via the switching backplane.

Figure 7:
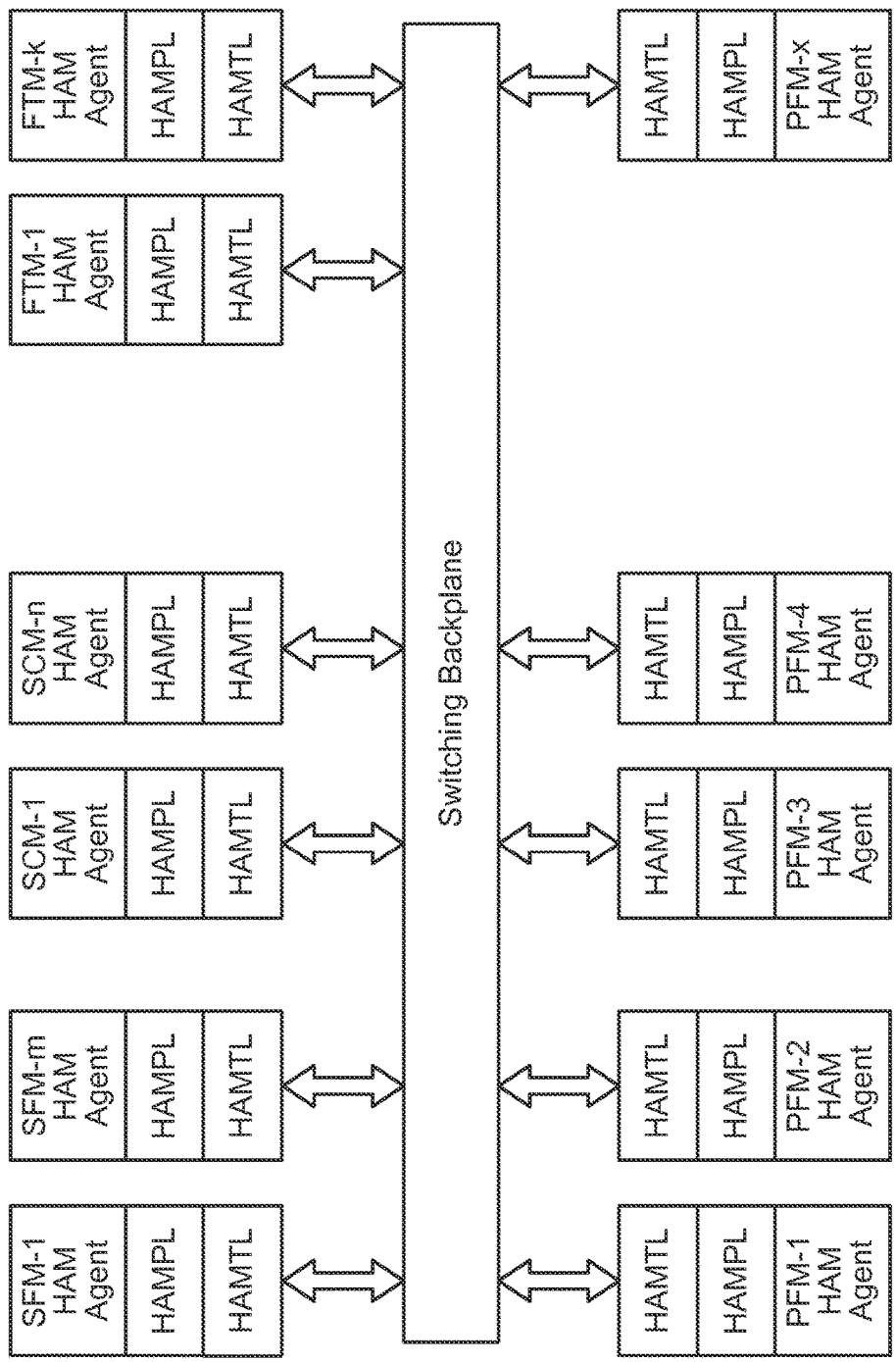
FIG. 7 illustrate an exemplary block diagram depicting the control plane's HM management Agents SFM-HMM-Agent, SCM-HMM-Agent, FTM-HMM-Agent, SFM-HMM-Agent interacting with protocol layers 'HMMPL & 'HMMTL' in each SFM, SCM, 'k' number of FTM and SFM connected via the switching backplane in accordance with various embodiments of the present invention.

SFM-y=>y-th Switch Fabric Module
SCM-y=>y-th Supervisory Control Module
FTM-y=>y-th Fan Tray Module (Cooling System)
SFM-y=>y-th Packet Forwarding Module A distributed chassis based switching system according to one embodiment will now be described. As shown in FIG. 7, a logical block diagram includes the control plane's HM management Agents SFM-HMM-Agent, SCM-HMM-Agent, FTM-HMM-Agent, SFM-HMM-Agent interacting with protocol layers 'HMMPL & 'HMMTL' in each of 'm' number of SFM(s), 'n' number of SCM(s), 'k' number of FTM(s) and 'x' number of SFM(s) which are connected via the switching backplane.

SFM-y-HMM-Agent=>HM Management Agent in y-th Switch Fabric Module.

SCM-y-HMM-Agent=>HM Management Agent in y-th Supervisory Control Module.

FTM-y-HMM-Agent=>HM Management Agent in y-th Fan Tray Module.

SFM-y-HMM-Agent=>HM Management Agent in y-th Packet Forwarding Module

Distributed Health Monitoring Message Communication Channel: Certain aspects of HM management, e.g. forwarding plane status query, configuration commands from SCM to SFM or SFM, require reliable, ordered delivery of messages with congestion control at the transport level. Connection oriented transport protocol like TCP or SCTP [RFC4960] will be suitable for such type of message deliveries. For some other type of messages, e.g. asynchronous event notifications from SFM or SFM towards SCM do not require guaranteed reliable delivery, as those messages can be recovered, in alternate manner, via status query from SCM to SFM or SFM. Thus unreliable and unordered data delivery method of either UDP or SCTP based transport would suffice in such cases.

In order to provide flexibility in choosing the type of transport protocol and also for backward compatibility with legacy implementation of HM management which may be using a different message transport mechanism other than TCP, UDP or SCTP, the HM management Agents should be configurable for transport protocol choices and port numbers.

The HMMTL is responsible for managing the transport protocol end points, i.e. sockets over which the messages of HMMPL are multiplexed and de-multiplexed. To provide a robust and fair share of transport layer communication resources among the HM management agents across the distributed chassis system, each agent would use three types of transport communication channels.

High Priority Transport Channel (HPTC)—This channel is used for exchanging high priority HM messages among the HM management agents running in SCM, SFM and SFM. The HMMTL in each of the SFM-HMM-Agent and SFM-HMM-Agent is responsible for opening and maintaining a separate transport layer socket connection with each of the SCM-HMM-Agent(s). The HMMTL will send and receive HMMPL's protocol messages over these socket interfaces.

Medium Priority Transport Channel (MPTC)—This channel is used for exchanging medium priority HM messages among the HM management agents running in SCM, SFM and SFM. The HMMTL in each of the SFM-HMM-Agent and SFM-HMM-Agent is responsible for opening and maintaining a separate transport layer socket connection with each of the SCM-HMM-Agent(s). The HMMTL will send and receive HMMPL's protocol messages over these socket interfaces.

Low Priority Transport Channel (LPTC)—This channel is used for exchanging low priority HM messages among the HM management agents running in SCM, SFM and SFM. The HMMTL in each of the SFM-HMM-Agent and SFM-HMM-Agent is responsible for opening and maintaining a separate transport layer socket connection with each of the SCM-HMM-Agent(s). The HMMTL will send and receive HMMPL's protocol messages over these socket interfaces.

Distributed Health Monitoring Message Scheduling Hierarchy: Since the results of distributed health monitoring determines the overall health and availability of the distributed switching platform, it's important that health monitoring protocol be highly reliable and robust. The health monitoring protocol message exchanges must be processed within a bounded delay and must not be impacted due to congestion in the control path switching network, inside distributed switching platform.

Distributed Health Monitoring Messages Priority Marking: The HM protocol messages must be grouped into appropriate priority classes and marked with appropriate CoS markings (e.g. 802.1P CoS marking or DSCP based IP header marking), so corresponding PHB treatment is applied to the those messages, in the hardware queues of internal control-path switching networks. Similarly when the HM protocol messages are sent or received through the hierarchies of protocol layer (HMMPL) and transport layer (HMMTL), in the control plane, the messages should be queued and scheduled based on the prioritization of transport channels, viz. 'HPTC', 'MPTC' and 'LPTC' respectively.

Distributed Health Monitoring Messages Fair Scheduling: A sub-system may have HM protocol connections with the HM-Agent(s) of several other sub-systems in the distributed platform. Also HM protocol connections from different sub-systems may carry different volume of traffic. Thus a particular sub-system having HM protocol connections with multiple different sub-systems is required to provide a fair share of the queuing and message scheduling services.

As an example, if the 'Active Master SCM-HM-Agent' has HM protocol connections with 'B' number of Backup SCM-HM-Agent(s), 'P' number of PFM-FM-Agent(s) and 'S' number of SFM-HM-Agent(s), then there will be a total of '3*(B+P+S)' number of HM protocol connections in the Master SCM, as listed below:

(B+P+S) number of HPTC connections to all the Backup-SCM(s), PFM(s) and SFM(s).

(B+P+S) number of MPTC connections to all the Backup-SCM(s), PFM(s) and SFM(s).

(B+P+S) number of LPTC connections to all the Backup-SCM(s), PFM(s) and SFM(s).

Among the 3 priority classes, i.e. HPTC, MPTC and LPTC, the message scheduling will be in a strict priority order, regardless of the sub-system sending or receiving the messages. However within any of the single priority class, i.e. HPTC, MPTC or LPTC, there are a total of (B+P+S) HM protocol connections from (B+P+S) number of different sub-systems. The send or receive messages across these (B+P+S) connections should be scheduled using a fair scheduling policy. This essentially implies that HM-Agent components should run hierarchical message scheduling to process the send or receive HM protocol messages. In other words, message scheduler would run a 'Weighted Round Robin (WRR)' scheduling policy, while sending or receiving HM protocol messages over any of the (B+P+S) HM protocol connections, that belong to the same transport channel priority class.

Distributed Health Monitoring Hierarchical Scheduling Algorithms: The hierarchical scheduler would work with 3 sets of queue groups, one for each of the HPTC, MPTC and LPTC priority classes. Thus for the above example, there will be 3 logical queue groups corresponding to HPTC, MPTC and LPTC, with each group containing (B+P+S) number of logical queues, Step-1) Check for HPTC queue group, if there are any queue containing messages.

Step-2) If there are messages, process messages from the '(B+P+S)' HPTC queues in a weighted round robin manner.

Step-3) If there more messages pending in the HPTC queue group, then go to 'Step-2'.

Step-4) Check for MPTC queue group, if there are any queue containing messages.

Step-5) If there are messages, process messages from the '(B+P+S)' queues in a weighted round robin manner Step-6) If there are no more messages pending in the MPTC queue group, then go to 'Step-7', else go to 'Step-2'.

Step-7) Check for LPTC queue group, if there are any queue containing messages.

Step-8) If there are messages, process messages from the '(B+P+S)' LPTC queues in a weighted round robin manner.

Step-9) If there no more messages pending in the LPTC queue group, then exit, else go to 'Step-2'.

Distributed Health Monitoring Message Prioritizations: Since the hierarchical message scheduling algorithm would facilitate a fair share of transport layer's processing resources across the incoming or outgoing HM protocol messages of different priority classes, it's important that specific HM protocol messages are categorized into appropriate priority classes. This would help avoid congestion and overloaded conditions in various sub-systems while processing HM protocol messages, in the context of HM Agents, which might compete for control plane processor time and control path bandwidth of switching system's internal communication links.

As an example HM protocol response message sending may be categorized as higher priority that receiving HM protocol request messages. Similarly sending of Heartbeat response messages should be of higher priority that receiving Heartbeat Poll request messages, as otherwise, the Heartbeat sender may timeout and conclude the slow responding slave agent is down (or crashed).

Distributed Health Monitoring Protocol Message Semantics: In the HM architecture, the message exchange happens in master-salve relationship. The SCM(s) play the role of master, when configuration commands and status enquiry requests are sent from SCM to the PFM or SFM. The PFM(s) & SFM(s) play the role of slave(s), while processing the command requests and sending responses to SCM(s). When PFM or SFM generate asynchronous event notifications, the event messages are destined to the SCM(s) and no response is expected from SCM(s).

HM Bi-Directional Tunnel Management Messages: In order for the sub-systems, viz. SCM(s), PFM(s) and SFM(s) to be able to exchange, the status enquiry request/response, asynchronous events, including the periodic Heartbeat messages among themselves, a logical bi-directional tunnel needs to be established between every pair of communicating sub-systems. These bi-directional tunnels, which are referred as HM Tunnel(s) are established using tunnel signaling messages, which are carried over the HMMPL layer.

HM Bi-Directional Tunnel Setup Request Message: This message is sent by a PFM or SFM entity to the SCM to setup a HM Bi-directional Tunnel. The SCM will attempt to establish the tunnel and send a response back to the PFM or SFM. The SCM will copy the Request-ID value to the Response-ID field, so that the PFM or SFM can match the response message with the correct pending Tunnel setup request.

HM Bi-Directional Tunnel Setup Response Message: This message is sent by a SCM entity to the PFM or SFM as a response to the HM Bi-directional Tunnel setup request. If the Tunnel establishment fails at SCM, then the response message will carry a non-zero value in the Failure Reason Code, otherwise this field will be set to zero to indicate a successful Tunnel setup. SCM while sending the response will set the destination ID to the value of the source ID received in the request message.

HM Bi-Directional Tunnel Teardown Message: This message is sent to teardown an existing HM Bi-directional Tunnel. The Bi-directional Tunnel teardown can be initiated from either side, i.e, either from SCM towards PFM/SFM or from PFM/SFM towards SCM. The teardown reason code parameter indicates the reason for deleting the tunnel.

HM Agent Configuration Messages: The HM configuration messages are used by the Master SCM to convey health monitoring control and policy parameters to secondary SCM(s), PFM(s), and SFM(s). The Health monitoring Agents running in secondary SCM(s), PFM(s) and SFM(s) will be restricted to only those HM actions, as mandated by these configuration parameters.

HM Agent Configuration Request Message: This message is sent by the master SCM to another secondary SCM or PFM or SFM sub-system to configure the health monitoring parameters of the HM Agent. The configuration message consists of a header followed by a list of optional configuration parameter TLV(s). All parameter TLVs are multiples of 4 Bytes in size, consisting of a 2-Byte 'Type' field, a 2-Byte 'Length' filed and a 'Value' field which is multiples of 4-Bytes in size. The 'Length' field contains the total length of the TLV, including itself and the 'Type' field. A parameter TLV can have a nested TLV in the 'Value' field, when the sender wants to group related parameters into a single composite TLV. In the case of nested TLVs, the inner TLV will be referred as sub-TLV.

The following parameter type codes used in TLV or sub-TLV are currently defined: —

Common Configuration Parameter Types: —

101—Heartbeat Interval Timer

102—Heartbeat Dead Interval

103—Automatic Restart of Software Process upon Failure (Value=Disable(1), Enable(2)).

104—Automatic Reset of Hardware Chip upon Failure (Value=Disable(1), Enable(2)).

105—Automatic Reset of Hardware Port, upon Failure or Packet Drop/Error threshold crossing (Value=Disable(1), Enable(2)).

106—Automatic Start of Diagnostic Self Test upon hardware component Failure (Value=Disable(1), Enable(2)).

SCM Group of Configuration Parameter Types: —

201—Backup SCM Sub-System Health Monitoring Administrative State (Value=Disable(1), Enable(2)).

202—Backup SCM Sub-System Health Monitoring Priority (Value=1-127).

203—SCM's Multi-Core Processor Health Monitoring Administrative State (Value=Disable(1), Enable(2)).

204—SCM's Control FPGA Health Monitoring Administrative State (Value=Disable(1), Enable(2)).

205—SCM's Control-Path Ethernet Switch's Health Monitoring Administrative State (Value=Disable(1), Enable(2)).

206—SCM's Temperature Sensor Health Monitoring Administrative State (Value=Disable(1), Enable(2)).

207—SCM's Flash Disk Health Monitoring Administrative State (Value=Disable(1), Enable(2)).

208—SCM's Network Management Interface Port Health Monitoring Administrative State (Value=Disable(1), Enable(2)).

209—SCM's Serial (Console) Interface Port Health Monitoring Administrative State (Value=Disable(1), Enable(2)).

210—SCM's Micro-controller Health Monitoring Administrative State (Value=Disable(1), Enable(2)).

211—SCM's memory module's Health monitoring Administrative State (Value=Disable(1), Enable(20).

PFM Group of Configuration Parameter Types: —

301—PFM Sub-System Health Monitoring Administrative State (Value=Disable(1), Enable(2)).

302—PFM's NPU Health Monitoring Administrative State (Value=Disable(1), Enable(2)).

303—PFM's TMC Health Monitoring Administrative State (Value=Disable(1), Enable(2)). 304—PFM's Control FPGA Health Monitoring Administrative State (Value=Disable(1), Enable(2)).

305—PFM's Statistics FPGA Health Monitoring Administrative State (Value=Disable(1), Enable(2)).

306—PFM's Control-Path Ethernet Switch's Health Monitoring Administrative State (Value=Disable(1), Enable(2)).

307—PFM's Temperature Sensor Health Monitoring Administrative State (Value=Disable(1), Enable(2)).

308—PFM's Flash Disk Health Monitoring Administrative State (Value=Disable(1), Enable(2)).

309—PFM's External TCAM Health Monitoring Administrative State (Value=Disable(1), Enable(2)).

310—PFM's Network Interface Port Health Monitoring Administrative State (Value=Disable(1), Enable(2)).

311—PFM's Fabric Interface Port Health Monitoring Administrative State (Value=Disable(1), Enable(2)).

312—PFM's Offload Network Processor Health Monitoring Administrative State (Value=Disable(1), Enable(2)).

313—PFM's memory module's Health monitoring Administrative State (Value=Disable(1), Enable(20).

314—PFM's Multi-Core Processor Health Monitoring Administrative State (Value=Disable(1), Enable(2)).

SFM Group of Configuration Parameter Types: —

401—SFM Sub-System Health Monitoring Administrative State (Value=Disable(1), Enable(2)).

402—SFM's Crossbar Switching Element(s) Health Monitoring Administrative State (Value=Disable(1), Enable(2)).

403—SFM's Control FPGA Health Monitoring Administrative State (Value=Disable(1), Enable(2)).

404—SFM's Control-Path Ethernet Switch's Health Monitoring Administrative State (Value=Disable(1), Enable(2)).

405—SFM's Temperature Sensor Health Monitoring Administrative State (Value=Disable(1), Enable(2)).

406—SFM's Flash Disk Health Monitoring Administrative State (Value=Disable(1), Enable(2)).

407—SFM's Fabric Interface Port Health Monitoring Administrative State (Value=Disable(1), Enable(2)).

408—SFM's memory module's Health monitoring Administrative State (Value=Disable(1), Enable(20).

409—SFM's Multi-Core Processor Health Monitoring Administrative State (Value=Disable(1), Enable(2)).

HM Agent Configuration Response Message: This message is sent by a secondary SCM or PFM or SFM sub-system to the Master SCM as a response to its' configuration request. If the configuration parameter setting fails or the request is rejected because of invalid values, then an appropriate error is sent in 'Failure Reason Code' field, other this field is set to zero in the response message.

HM Agent Status Query Request Message: The status query messages are sent from the Active Master SCM to a PFM, SFM or another Backup SCM sub-system to query status data regarding: —

HM capabilities of the sub-systems.

Operational statistics of the components in the sub-systems.

Statistics of component failures.

Statistics of component's fault repairs.

The status query request message consists of the HM header and one or more parameter TLVs to request for the retrieval of above type of status data. The parameter TLV will be of length multiples of 4-bytes and will contain fields, viz. Type (2-Byte), Length (2-Byte). The 'Length' field will contain the length of the TLV, including the 'Type' and 'Length' field itself HM Agent Status Query Response Message: The status query response message is sent by a PFM, SFM or a Backup SCM to the Active Master SCM, as a response to the received status query request message. The PFM, SFM or the Backup SCM sub-system upon receiving a Status query message, will fetch the necessary data and send those in the status query response message. The status query response message will contain the HM header and one or more response data TLV(s) corresponding to the parameter TLVs received in the status query request message. The sender's ID of the Master SCM as received in the request message will be set as destination ID in the HM header, while sending the status query response. The response data TLV will be of length multiple of 4-bytes and will contain fields, viz. Type (2-Byte), Length (2-Byte) and Value (multiple of 4-Bytes). The 'Length' field will contain the length of the entire TLV, including the 'Type' and 'Length' field itself HM Event Notification Message: The Event notification message is asynchronously sent from a PFM, SFM or a Backup SCM to the Active Master SCM. The Event notification message consists of a HM header and one or more 'Event Parameter TLV(s)'.

An 'Event Parameter TLV' will be of length multiple of 4-bytes and will contain fields, viz. Type (2-Byte), Length (2-Byte) and Value (multiples of 4-Bytes). The 'Length' field will contain the length of the entire TLV, including the 'Type' and 'Length' field itself. The Master SCM may be interested only in certain event notifications, which are of importance from the health monitoring point of view. Thus PFM, SFM and Backup SCM sub-systems would allow dynamic registration/un-registration of events via configuration request messages from the Master SCM. The PFM, SFM and Backup SCM(s) would send only those event notifications, which were registered by the Active Master SCM.

HM Heartbeat Message: The HM Heartbeat message is periodically exchanged between SCM & PFM and also between SCM & SFM for liveness check. The SCM sends the Heartbeat message asynchronously as a Heartbeat poll request to PFM and SFM respectively. The PFM or SFM upon receiving the Heartbeat request, immediately sends a Heartbeat Poll response back to SCM. While sending the Heartbeat request message, SCM encodes it's SCM-ID as the source ID and either PFM-ID or SFM-ID as the destination ID, depending on if the message is sent to a PFM or to a SFM. While sending a Heartbeat response message, the source ID and destination ID values from the request message are reversed. In other words a PFM will encode its PFM-ID as the source ID and requesting SCM's ID as the destination ID, whereas a SFM will encode it's SFM-ID as the source ID and requesting SCM's ID as the destination ID, while sending the Heartbeat response to the SCM.

If the SCM requests optional status and statistics of forwarding plane objects via Heartbeat request, then PFM or SFM should also include the values of those parameters in the optional data TLV of the Heartbeat response. Whether a SCM will include status and statistics query of forwarding plane objects in the Heartbeat request is decided by the HM policies configured at SCM-HM-Agent.

Distributed Health Monitoring in a Check-pointing and Replication Architecture according to one embodiment will now be described. For high availability purposes, distributed switching platform often use redundancy in the architecture. In order to provide a reliable and highly available, routing and signaling control protocol operations, redundant SCM sub-systems are most often present in the distributed platform. In order to guarantee a seamless continuation of routing & signaling control protocol operation, in the event of primary SCM sub-system failure, the configuration parameters and the dynamic states of control protocols should remain synchronized between the primary and backup SCMs. Thus in a high availability supported distributed architecture, all the configuration parameters of various control protocols are saved in a persistent database storage. After a restart of the SCM sub-systems, the saved configurations can be retrieved and reloaded from the database storage.

In order to be able to retrieve the dynamic states of the control protocols, after a SCM restart, these dynamic states should also be saved in the persistent database storage.

When there are redundant set of SCM sub-systems in the role of Primary & Backup(s), both the configuration parameters and dynamic control protocol states, should be made available in Primary SCM, persistent Database storage and Backup SCM(s). In other words whenever the configuration parameters or the dynamic states of control protocols are changed in primary SCM, those should also be check-pointed on the Backup SCM(s), i.e. the changes should be written in persistent DB and also replicated in the Backup SCM sub-system(s). The Backup SCM sub-system(s) will run health monitoring in the slave mode and respond to the Heartbeat poll requests and status query requests from the Master (Primary) SCM.

Distributed Health Monitoring Master Switchover: When there are redundant SCM(s) in the distributed switching platform, the health monitoring operation would be seamless, i.e. overall availability of the switching system will not be impacted, in the event of a failure of the Master SCM. The Master SCM, during it's normal Heartbeat processing, will build a HM Status Table, containing 2-tuples of the form <Backup SCM ID, Backup SCM Priority> for those Backup SCM(s) which are responding to its' Heartbeat Poll requests. The Master SCM based on the HM Policy configuration may send this 'HM Status Table' embedded in the Heartbeat Poll request to all other sub-systems in the distributed platform.

Though the PFM(s) and SFM(s) will establish and maintain HM Tunnel(s) with all the available Backup SCM(s), the health status of the Backup SCM(s) may not be known, since there are no periodic status refreshes of the Tunnels and also the HMMTL layer may not always be using a connection oriented transport protocol. By receiving the 'HM Status Table' via Heartbeat messages from Master SCM, the Backup SCM, PFM and SFM sub-systems would learn whether or not, the other Backup SCM(s), are currently alive. Thus when the current Master SCM fails, the remaining Backup SCM(s) will detect this failure, through Heartbeat misses from the Master, and the next highest priority Backup SCM that is operational will become the new Master.

The new Master SCM will announce itself as the HM Master via discovery updates to all the other SCM(s), the PFM(s) and SFM(s), to make sure that all the sub-systems in the distributed switching platform are aware of the fact that the old HM Master is dead and the announcing SCM is the new HM Master. After this the new Master SCM will start sending periodic Heartbeat Poll requests to all other sub-systems in the distributed switching platform. When the Master SCM fails and the next highest priority Backup SCM becomes the new Master, all the PFM, SFM and other Backup SCM sub-systems would automatically invalidate the event registrations of the previous Master SCM, which is now dead. The new Master SCM will need to register for Asynchronous Events with all the PFM, SFM and other remaining Backup SCM(s), so that those sub-systems will be able to continue to generate Events for the new Master. However Event re-registration after a Master SCM switchover, may cause delay in setting the new Master ready to receive events. Thus to make Master SCM switchover process faster, all the non-Master (Backup) SCM(s) after the initial discovery and capability exchanges, may register for asynchronous events with all PFM, SFM and other remaining backup sub-systems, to avoid post switchover registration delay. If the non-Master (Backup) SCMs does event registration, then they will not receive asynchronous events, until they become the elected Master SCM. In other words the PFM(s), SFM(s) and all other Backup SCM sub-systems will not send events to non-Master (Backup) SCM(s).

Distributed Health Monitoring Interaction with Graceful Restart: When control plane routing & signaling protocol undergoes graceful restart, only the SCM sub-system resident software components are restarted. However the control plane software components that are running on PFM or SFM and PFM or SFM sub-systems continue to stay alive. Thus for a brief period of time, Health monitoring Agents in PFM and SFM will not hear Heartbeat poll requests from the primary SCM. The HM Agents in PFM or SFM and PFM or SFM sub-systems should be configured with Hold Down timers, such that Master SCM before doing a Graceful Restart, will broadcast a 'Master SCM Graceful Restart" to all the PFMs, SFMs and any other secondary SCMs present in the switching platform. The HM Agents in PFM and SFM upon receiving this message, will start the Hold Down timers.

During this time period, the PFM or SFM will not send or receive Heartbeat poll requests/responses from/to Master SCM. The PFM or SFM and PFM or SFM sub-systems will however continue to forward traffic at the data plane.

The PFM(s) and SFM(s) after receiving 'Master SCM Graceful Restart' message, will also search in their SCM connection table to find the next highest priority backup SCM, which is connected and operationally UP. The PFM(s) and SFM(s) will start using this highest priority backup SCM as the new Master SCM. Similarly the backup SCM(s) after receiving 'Master SCM Graceful Restart' message will search in their SCM connection table to find the next highest priority backup SCM, that is connected and operationally Up. The backup SCM which has the highest priority configured will now advertise itself as 'Active Master SCM' and all other backup SCM(s) will continue to function in standby mode. The new 'Active Master SCM' will start refreshing HM configuration messages with the PFM(s), SFM(s) and other remaining backup SCM(s). After receiving HM configuration refreshes, the PFM(s), SFM(s) and standby SCM(s) will stop the Hold-Down timers. After this the new Master SCM will start handling normal Heartbeat Poll request/response messages. However if the PFM(s), SFM(s) and standby SCM(s) do not find any connected and operationally UP backup SCM or are not able to connect with any other backup SCM, then they will wait for the Hold-Down timer expiry. If the Hold-Down timer expires and no 'Active Master SCM' is found, then PFM(s), SFM(s) and any backup SCM, will react based on the configured HM policy. In other words, based on the HM policy, the PFM(s), SFM(s) and SCM(s) may all restart/reboot or stay in disconnected state, for operation intervention. If the restarting SCM comes back operationally UP before the Hold-Down timer expires, then it will re-initiate HM discovery process and, will either become the 'Active Master SCM' again or will assume the role of a standby SCM, if another backup SCM had already started playing the role of 'Active Master SCM.

Distributed Health Monitoring during In-Service Software Upgrade (ISSU) in accordance with one embodiment of the invention will now be described. In software upgrade procedures during planned network maintenance, installation of new software features or defect fixes, often require several minutes of downtime. However it's important for service providers and network operators that network should continue to provide critical network services and access to important business applications, which require the maintenance window to be very small or rather absent. Thus to facilitate software upgrades with zero downtime, the upgrade mechanism should allow the switching system's traffic forwarding capability to be not disrupted. This in-service upgrade procedure utilizes the redundancy in the hardware and software architecture of the switching system and software image versioning capability.

Software Image Versioning Compatibility: In a componentized software architecture, the switching software can be decomposed into a number of sub-systems which are responsible for handling specific aspects of switching control plane functionalities. Each software sub-system can be further broken into a group of components which perform part of the sub-system's functions. This hierarchically partitioned software architecture allows modular software upgrade. In other words when some defect fixes, or feature modification or new feature addition, require change only in few software components, only those changed components need to be upgraded, rather than upgrading entire software image in the switching system. Thus to track software changes at a individual software component level, two version number attributes, a major version number and a minor version number, are introduced for each component. A component's version number is represented as a tuple <m, n>, where 'm' indicates the Major version and 'n' indicates the minor version.

A Major version number changes, only when a component is newly created or it's design and implementation is significantly changed, such that it will not be compatible with older versions. The Minor version number changes when the component's software functions are modified, but still remaining compatible with older minor version numbers. Also when the Major version number of a component is increased, it's Minor version number is reset to '1' to indicate first release of that Major version. Similarly the software version of a sub-system is represented using a tuple <m, n>, where 'm' indicates the Major version and 'n' indicates the minor version. However a sub-system's version has hierarchical relationship of dependency with the version numbers of its constituent components. In one aspect, a system image 'I' consists of 'M' number of sub-systems 'S1', 'S2', 'S3', . . . 'SM', i.e. I={S1, S2, S3, . . . SM}. Also let any sub-system 'Si' consists of 'N' number of components 'C(i,1)', 'C(i,2)', 'C(i,3)' . . . 'C(i, N)', i.e. Si={C(i,1), C(i,2), C(i,3), . . . C(I,N)}. Also, a 'Basis Component Set (BCS)' is the collection of components, which determine the compatibility of a sub-system's version with its' older versions. In other words if one or more components in the BCS undergo changes, such that their major version number increase, then the BCS is not backward compatible, which will make the sub-system too not backward compatible. Let the BCS of a sub-system 'Si' be represented as BCS(Si)={C(i, b1), C(i, b2), . . . C(i,bp)}. Similarly, a 'Basis Sub-system Set (BSS)' is the collection of sub-systems, which determine the compatibility of a system image's version with its' older versions. In other words if one or more sub-systems in the BSS undergo changes, such that their major version number increase, then the BSS is not backward compatible, which will make the system image too not backward compatible.

Software Image Version Check Protocol (IVCP): When a new software image is built, a hierarchical version mapping structure is created, which is used for version compatibility checking. The version mapping structure is stored embedded in the software image and also maintained in technical reference documentation.

The software version compatibility check is performed during:—
Software upgrades.
A new SFM is inserted into a slot.
An existing SFM is reset or rebooted.
A new FSM is inserted into a slot.
An existing FSM is reset or rebooted.
A new SCM is inserted as primary or standby.
An existing primary or standby SCM is reset or rebooted.

In order to check version compatibility between two instances of software images, an Image Version Check Protocol (IVCP) is used which validates software image versions at sub-system level and also for each sub-system at component level. The hardware platforms that load or run the image instances are termed as in-service software upgrade (ISSU) client. During upgrade each ISSU client queries version mapping compatibility information from the other ISSU client. An ISSU client after receiving version compatibility check request, performs a compatibility check by comparing the received version mapping structure with its' locally stored version mapping structure.

The results of compatibility check is returned to the requester as either 'Incompatible' or 'Partially Compatible' or 'Fully Compatible'. When deciding on compatibility check, the lower value of the two version numbers is considered as the negotiated version number for a component or sub-system. If the result of negotiation is 'Incompatible' then software upgrade will not be performed and an warning message will be logged. When the result is 'Partially Compatible'

Impact of Health Monitoring on Software Image Upgrade: Since the health monitoring functions represent the vital components of a sub-system's control plane software infrastructure, they form part of the 'Basis Component Set (BCS)'. Similarly the distributed health monitoring functions that operate in the distributed control plane, across the various sub-systems of the distributed switching platform, also form part of the 'Basis Sub-System Set (BSS)'. In the control plane software sub-systems, the addition of a new feature or modification of an existing feature should be designed and implemented such that, health monitoring infrastructure is not significantly changed, to extend the monitoring for the newly defined features. This will make sure that BCS and BSS are not turned into backward incompatible versions in the new image. Thus the distributed health monitoring architecture proposed in this document, should remain generic and equally applicable to any sub-system or control plane software features.

Various embodiments, as described above, provide a method and system for intelligent distributed health monitoring in the switching system, which has several advantages. One of the several advantages of this invention is that it provides self-corrective provisions and is able to trigger corrective actions whenever any operational failures are identified in the switching system equipment. These corrective actions may include re-running diagnostic tests, resetting the components such as control switch or control processors of the cards, resetting error or fault counters, restarting the entire switching system equipment in the event of an unrecoverable error, logical exclusion of faulty components via resource partitioning, triggering a switchover of a primary supervisory card to a standby supervisory card, and the like. Another advantage of this invention is that it provides distributed health monitoring and self-correction mechanisms, health monitoring and self-correction mechanisms are performed by the health monitoring modules of supervisory cards, line cards, and switch fabric cards. This capability impacts both reliability and performance of switching system equipment, and as a result, also improving reliability of services such as MPLS and GMPLS. Yet another advantage of some embodiments is that the current invention also uses statistical performance measurement or threshold violation monitoring as a tool to identify potential problems in the switching system equipment.

The present invention makes the switching system equipment more reactive and responsive to component failures or component under performance. Further, as the present invention monitors the health status in real time, it localizes the failure impact and enhances the reliability of services dependent on the switching system equipment.

While the foregoing disclosure shows illustrative embodiments of the invention, it should be noted that various changes and modifications could be made herein without departing from the scope of embodiments of the invention as defined by the appended claims.

Likewise, the functions, steps and/or actions of the methods in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for distributed health monitoring and fault repairing in switching system equipment, the switching system equipment having a supervisory card, a line card, and a switch fabric card, wherein the supervisory card is interconnected with the line card and the switch fabric card through a backplane, each of the supervisory card, the line card, and the switch fabric card having corresponding control processors capable of running embedded operating systems, the method comprising:
   transmitting a health status poll request message to the line card and the switch fabric card from the supervisory card, wherein the supervisory card is separate from the line card and the switch fabric card and communicates with each over the backplane for the transmitting;
   receiving a health status poll response message by the supervisory card from each of the line card and the switch fabric card in response to the health status poll request message, wherein the health status poll response message comprises a health status summary report of hardware and software modules of one of the corresponding line card and switch fabric card;
   discovering a relationship between all cards in the switching system based on the health status poll response message to maintain an up-to-date topology of the cards for the health monitoring;
   detecting a fault in the switching system equipment by the supervisory card based on an analysis of the health poll response message; and
   automatically triggering an action to repair the fault detected in the switching system equipment, wherein the action is triggered based on a set of predefined policies, wherein the action comprises any one or more of re-running a set of diagnostic tests, resetting the control processors of the cards, restarting the switching system equipment, triggering a self-repair through restart of the cards, and triggering a switchover of a first supervisory card to a second supervisory card already operating in the switching system equipment.

2. The method as recited in claim 1, wherein the health status poll request message is transmitted periodically by a master health monitor module running on the supervisory card.

3. The method as recited in claim 2, wherein the fault in the switching system equipment is detected by the master health monitor module based on an analysis of the health poll response message.

4. The method as recited in claim 1, wherein the health status poll response message corresponding to the line card is generated by a slave health monitor module running on the line card.

5. The method as recited in claim 4, wherein the fault in the switching system equipment is detected by the slave health monitor module.

6. The method as recited in claim 1, wherein the health status poll response message corresponding to the switch fabric card is generated by a slave health monitor module running on the switch fabric card.

7. The method as recited in claim 6, wherein the fault in the switching system equipment is detected by the slave health monitor module.

8. The method as recited in claim 1, wherein the health status poll response message includes performance statistics information of the hardware and software modules on one of the line card and switch fabric card.

9. The method as recited in claim 8, wherein the performance statistics information comprises a transmitted and received packet count, a transmitted and received byte count, a packet drop count of traffic through internal and external physical and logical ports.

10. A method for distributed health monitoring and fault repairing in switching system equipment, the switching system equipment having at least one supervisory card, one or more line cards, and one or more switch fabric cards, wherein the at least one supervisory card is interconnected with the one or more line cards and the one or more switch fabric cards through a backplane, each of the at least one supervisory card, the one or more line cards, and the one or more switch fabric cards having corresponding control processors capable of running embedded operating systems, the method comprising:

multicasting a master health status summary report message from the at least one supervisory card to the one or more line cards and the one or more switch fabric cards, wherein the at least one supervisory card is separate from the one or more line cards and the one or more switch fabric cards and communicates with each over the backplane for the multicasting;

receiving one or more slave health status summary report messages by the at least one supervisory card from each of the one or more line cards and the one or more switch fabric cards in response to the master health status summary report message, wherein each of the one or more slave health status summary report messages comprise a health status summary of hardware and software modules of the corresponding line card or switch fabric card;

discovering a relationship between all cards in the switching system based on the one or more slave health status summary report messages to maintain an up-to-date topology of the cards for the health monitoring;

detecting one or more faults in the switching system equipment by the at least one supervisory card based on an analysis of the master health status summary report message and the one or more slave health status summary report messages; and automatically triggering at least one action to repair the one or more faults detected in the switching system equipment, wherein the at least one action is triggered based on a set of predefined policies, wherein the at least one action comprises any one or more of re-running a set of diagnostic tests, resetting the control processors of the cards, restarting the switching system equipment, triggering a self-repair through restart of the cards, and triggering a switchover of a first supervisory card to a second supervisory card already operating in the switching system equipment.

11. The method as recited in claim 10, wherein the master health status summary report message is transmitted periodically by a master health monitor module running on the at least one supervisory card.

12. The method as recited in claim 11, wherein the faults in the switching system equipment are detected by the master health monitor module based on the analysis of said slave health status summary report messages and said master health status summary report message.

13. The method as recited in claim 10, wherein the slave health status summary report message corresponding to a line card of the one or more line cards is generated by a slave health monitor module running on the line card of the one or more line cards.

14. The method as recited in claim 13, wherein the faults in the switching system equipment are detected by the slave health monitor module based on the analysis of said slave health status summary report messages and said master health status summary report message.

15. The method as recited in claim 10, wherein the slave health status summary report message corresponding to a switch fabric card of the one or more switch fabric cards is generated by a slave health monitor module running on the switch fabric card of the one or more switch fabric cards.

16. The method as recited in claim 15, wherein the faults in the switching system equipment are detected by the slave health monitor module based on the analysis of said slave health status summary report messages and said master health status summary report message.

17. The method as recited in claim 10, wherein said slave health status summary report messages and said master health status summary report message include performance statistics information of the hardware and software modules of the corresponding card.

18. The method as recited in claim 10, wherein the at least one action is selected from the group comprising re-running a set of diagnostic tests, resetting the control processors of the cards, restarting the switching system equipment, triggering a self-repair through restart of the cards, and triggering a switchover of a first supervisory card to a second supervisory card.

19. A supervisory card for distributed health monitoring and fault repairing in switching system equipment, the supervisory card comprising:

one or more control processors capable of running an embedded operating system;

connections to the switching system equipment comprising a line card and a switch fabric card, wherein the supervisory card is interconnected with the line card and the switch fabric card through a backplane, each of the line cards and the switch fabric card having corresponding control processors capable of running embedded operating systems, wherein the one or more control processors are configured to
- transmit a health status poll request message to the line card and the switch fabric card from the supervisory card, wherein the supervisory card is separate from the line card and the switch fabric card and communicates with each over the backplane for the transmission of the health status poll message;
- receive a health status poll response message by the supervisory card from each of the line card and the switch fabric card in response to the health status poll request message, wherein the health status poll response message comprises a health status summary report of hardware and software modules of one of the corresponding line card and switch fabric card;
- discover a relationship between all cards in the switching system based on the health status poll response message to maintain an up-to-date topology of the cards for the health monitoring;
- detect a fault in the switching system equipment by the supervisory card based on analysis of the health poll response message; and
- automatically trigger an action to repair the fault detected in the switching system equipment, wherein the action is triggered based on a set of predefined policies; wherein the action comprises any one or more of re-running a set of diagnostic tests, resetting the control processors of the cards, restarting the switching system equipment; triggering a self-repair through restart of the cards, and triggering a switchover of a first supervisory card to a second supervisory card already operating in the switching system equipment.

* * * * *